(12) United States Patent
Tenghamn

(10) Patent No.: US 12,105,240 B2
(45) Date of Patent: Oct. 1, 2024

(54) LONG-OFFSET ACQUISITION WITH IMPROVED LOW FREQUENCY PERFORMANCE FOR FULL WAVEFIELD INVERSION

(71) Applicant: PGS Geophysical AS, Oslo (NO)

(72) Inventor: Stig Rune Lennart Tenghamn, Hollywood, FL (US)

(73) Assignee: PGS Geophysical AS, Oslo (NO)

( * ) Notice: Subject to any disclaimer, the term of this patent is extended or adjusted under 35 U.S.C. 154(b) by 597 days.

(21) Appl. No.: 17/065,155

(22) Filed: Oct. 7, 2020

(65) Prior Publication Data

US 2021/0124074 A1   Apr. 29, 2021

Related U.S. Application Data

(60) Provisional application No. 62/926,671, filed on Oct. 28, 2019.

(51) Int. Cl.
*G01V 1/38* (2006.01)
*G01V 1/20* (2006.01)

(52) U.S. Cl.
CPC ............ *G01V 1/3843* (2013.01); *G01V 1/201* (2013.01); *G01V 1/3808* (2013.01); *G01V 1/3817* (2013.01)

(58) Field of Classification Search
CPC .... G01V 1/3843; G01V 1/201; G01V 1/3808; G01V 1/3817
See application file for complete search history.

(56) References Cited

U.S. PATENT DOCUMENTS

| 2,757,356 A | 7/1956 | Haggerty |
| 3,744,021 A | 7/1973 | Todd |
| 4,693,336 A | 9/1987 | Newman |
| 4,914,636 A | 4/1990 | Garotta |
| 4,970,696 A | 11/1990 | Crews et al. |
| 5,083,297 A | 1/1992 | Ostrander |

(Continued)

FOREIGN PATENT DOCUMENTS

| CA | 2300116 C | 3/1999 |
| EP | 2261615 A2 * | 12/2010 | ............. G01V 1/201 |

(Continued)

OTHER PUBLICATIONS

United Kingdom Combined Search and Examination Report dated Sep. 20, 2021, for Application No. GB2017036.1.

(Continued)

*Primary Examiner* — Krystine E Breier

(57) ABSTRACT

A marine streamer includes: an optical fiber disposed along a length of the streamer; a light source; and light analysis equipment, wherein: the length is at least 20 km, a diameter of the streamer is no more than 25 mm, the optical fiber, light source, and light analysis equipment are configured to provide a receiver sampling density of at least 1 per meter, and the streamer is configured to be towed nominally horizontally through a body of water. A method of marine surveying includes: towing a streamer spread at a first depth of 10 m to 30 m with a survey vessel; and towing Distributed Acoustic Sensing (DAS) streamers at a second depth of greater than 30 m. A method includes: acquiring long-offset data with sensors distributed along the DAS streamers.

10 Claims, 14 Drawing Sheets
(6 of 14 Drawing Sheet(s) Filed in Color)

(56) References Cited

U.S. PATENT DOCUMENTS

| | | |
|---|---|---|
| 5,148,406 A | 9/1992 | Brink et al. |
| 5,345,522 A | 9/1994 | Vali et al. |
| 5,424,999 A | 6/1995 | Manin |
| 5,761,152 A * | 6/1998 | Jacobsen ............ G01V 1/3808 367/20 |
| 5,973,995 A | 10/1999 | Walker et al. |
| 6,510,390 B1 | 1/2003 | Bunting et al. |
| 6,925,386 B2 | 8/2005 | Pramik et al. |
| 7,123,543 B2 | 10/2006 | Vaage et al. |
| 7,379,386 B2 | 5/2008 | Muyzert et al. |
| 7,450,467 B2 | 11/2008 | Tveide et al. |
| 7,577,060 B2 | 8/2009 | Toennessen et al. |
| 7,957,221 B2 | 6/2011 | Kluver et al. |
| 8,873,332 B2 | 10/2014 | Madnroux et al. |
| 8,908,469 B2 | 12/2014 | Hill et al. |
| 9,019,796 B2 | 4/2015 | Guevel et al. |
| 9,075,162 B2 | 7/2015 | Baardman et al. |
| 9,103,943 B2 | 8/2015 | Cowlard et al. |
| 9,250,345 B2 | 2/2016 | Mattsson |
| 9,261,619 B2 | 2/2016 | Mandroux et al. |
| 9,310,503 B2 | 4/2016 | Rentsch et al. |
| 9,360,575 B2 | 6/2016 | Etienne et al. |
| 9,405,029 B2 | 8/2016 | Howieson et al. |
| 9,429,667 B2 | 8/2016 | Vyas et al. |
| 9,513,391 B2 | 12/2016 | Keers et al. |
| 9,599,735 B2 | 3/2017 | Oscarsson |
| 9,651,695 B2 | 5/2017 | Lu et al. |
| 9,733,376 B2 | 8/2017 | Landais et al. |
| 9,772,418 B2 | 9/2017 | Sykes |
| 9,880,047 B2 | 1/2018 | Martin et al. |
| 9,880,048 B2 | 1/2018 | Martin et al. |
| 9,897,713 B2 | 2/2018 | Vageskar et al. |
| 9,910,176 B2 | 3/2018 | McKey, III |
| 9,932,093 B2 | 4/2018 | Sudow et al. |
| 9,958,564 B2 | 5/2018 | Grenie et al. |
| 10,001,576 B2 | 6/2018 | Grenie et al. |
| 10,031,248 B2 | 7/2018 | Bernitsas et al. |
| 10,042,073 B2 | 8/2018 | Bjornemo et al. |
| 10,054,705 B2 | 8/2018 | Hillesund et al. |
| 10,073,184 B2 | 9/2018 | Faber et al. |
| 10,094,942 B2 | 10/2018 | Brenders et al. |
| 10,139,269 B2 | 11/2018 | Den Boer et al. |
| 10,139,511 B2 | 11/2018 | Mensch |
| 10,234,585 B2 | 3/2019 | Long |
| 10,267,939 B2 | 4/2019 | Eick et al. |
| 10,281,602 B2 | 5/2019 | Moldoveanu et al. |
| 10,338,258 B2 | 7/2019 | Chalenski |
| 10,379,256 B2 | 8/2019 | Adams et al. |
| 10,459,100 B2 * | 10/2019 | Hegna ................ G01V 3/17 |
| 10,479,455 B2 | 11/2019 | Toennessen |
| 10,557,761 B2 | 2/2020 | Molteni et al. |
| 10,627,534 B2 | 4/2020 | Bernitsas |
| 10,712,463 B2 | 7/2020 | Leveille et al. |
| 11,480,700 B2 | 10/2022 | Siliqi et al. |
| 2006/0133200 A1 | 6/2006 | Tenghamn |
| 2008/0137480 A1 | 6/2008 | MacNeill |
| 2009/0147620 A1 | 6/2009 | Pan et al. |
| 2009/0296518 A1 | 12/2009 | MacNeill et al. |
| 2009/0296520 A1 | 12/2009 | Keers et al. |
| 2010/0313659 A1 * | 12/2010 | Berg .................. G01V 13/00 367/157 |
| 2011/0090760 A1 | 4/2011 | Rickett et al. |
| 2011/0199857 A1 | 8/2011 | Garden |
| 2011/0305107 A1 | 12/2011 | Eick et al. |
| 2012/0014212 A1 | 1/2012 | Eick et al. |
| 2012/0020184 A1 * | 1/2012 | Wilson ............... G01V 1/201 367/19 |
| 2012/0092956 A1 | 4/2012 | Soubaras |
| 2012/0227504 A1 * | 9/2012 | Goldner .............. G01H 9/00 156/172 |
| 2013/0114373 A1 | 5/2013 | Mandroux et al. |
| 2013/0170316 A1 | 7/2013 | Mandroux |
| 2014/0160885 A1 * | 6/2014 | Tenghamn ........... G01V 1/3817 367/16 |
| 2014/0198611 A1 * | 7/2014 | Siliqi ................ G01V 1/3808 367/20 |
| 2014/0241118 A1 | 8/2014 | Landais et al. |
| 2015/0003195 A1 | 1/2015 | Widmaier et al. |
| 2015/0009779 A1 | 1/2015 | Mandroux et al. |
| 2015/0078124 A1 | 3/2015 | Lu et al. |
| 2015/0234065 A1 | 8/2015 | Lecocq et al. |
| 2015/0241587 A1 | 8/2015 | Baardman |
| 2015/0293250 A1 | 10/2015 | Baardman et al. |
| 2016/0097870 A1 | 4/2016 | Routh et al. |
| 2016/0131785 A1 | 5/2016 | Tonchia |
| 2016/0139284 A1 | 5/2016 | Meech |
| 2016/0187504 A1 | 6/2016 | Brenders et al. |
| 2016/0202378 A1 | 7/2016 | Ridsdill-Smith et al. |
| 2016/0245941 A1 | 8/2016 | Ronholt et al. |
| 2016/0356907 A1 | 12/2016 | Mensch |
| 2016/0363682 A1 | 12/2016 | Grenie et al. |
| 2017/0075010 A1 * | 3/2017 | Mandroux ........... G01V 1/3808 |
| 2017/0075011 A1 | 3/2017 | Ni et al. |
| 2017/0168178 A1 | 6/2017 | Crawley et al. |
| 2017/0176636 A1 | 6/2017 | Adams et al. |
| 2017/0205520 A1 | 7/2017 | Moldoveanu et al. |
| 2017/0285197 A1 | 10/2017 | Bernitsas |
| 2017/0363760 A1 | 12/2017 | Mensch et al. |
| 2017/0371069 A1 * | 12/2017 | Malling ............... G01V 1/226 |
| 2018/0002526 A1 | 1/2018 | Hillesund |
| 2018/0156933 A1 | 6/2018 | Ahmed |
| 2018/0164456 A1 | 6/2018 | Chalenski |
| 2018/0164457 A1 | 6/2018 | Beitz et al. |
| 2018/0172856 A1 | 6/2018 | Hillesund |
| 2018/0274953 A1 | 9/2018 | Molteni |
| 2019/0064380 A1 | 2/2019 | Sharma |
| 2019/0154858 A1 | 5/2019 | Long |
| 2020/0393590 A1 | 12/2020 | Tenghamn |
| 2021/0124073 A1 | 4/2021 | Tenghamn |
| 2021/0124074 A1 | 4/2021 | Tenghamn |
| 2021/0141117 A1 | 5/2021 | Tenghamn et al. |
| 2023/0273334 A1 | 8/2023 | Cramer et al. |

FOREIGN PATENT DOCUMENTS

| | | | |
|---|---|---|---|
| EP | 3101451 A1 | 7/2016 | |
| EP | 3 088 919 A1 | 11/2016 | |
| GB | 1506189 | 4/1978 | |
| GB | 2394051 A | 4/2004 | |
| GB | 2404025 A | 1/2005 | |
| GB | 2425596 A | 11/2006 | |
| GB | 2460073 A * | 11/2009 | ............ G01V 1/3808 |
| GB | 2491260 A | 11/2012 | |
| GB | 2494040 A | 2/2013 | |
| GB | 2497645 A | 6/2013 | |
| GB | 2515658 A | 12/2014 | |
| GB | 2536052 A * | 9/2016 | ......... G01D 5/35358 |
| GB | 2567059 A | 4/2019 | |
| GB | 2589011 A | 5/2021 | |
| GB | 2599849 A | 4/2022 | |
| WO | 9618117 A1 | 6/1996 | |
| WO | 2009131619 A2 | 10/2009 | |
| WO | 2012054635 A2 | 4/2012 | |
| WO | 2014022346 A1 | 2/2014 | |
| WO | 2014161044 A1 | 10/2014 | |
| WO | 2015011247 A1 | 1/2015 | |
| WO | 2015195939 A1 | 12/2015 | |
| WO | 2016011250 A1 | 1/2016 | |
| WO | WO-2016009270 A1 * | 1/2016 | ............. G01V 1/005 |
| WO | 2017102289 A1 | 6/2017 | |
| WO | 2017195093 A1 | 11/2017 | |
| WO | 2018217872 A1 | 11/2018 | |
| WO | 2018229553 A1 | 12/2018 | |
| WO | 2019018894 A1 | 1/2019 | |
| WO | 2019043452 A1 | 3/2019 | |
| WO | 2019246297 A1 | 12/2019 | |
| WO | 2020 008 259 A1 | 1/2020 | |
| WO | 2022016049 A1 | 1/2022 | |

OTHER PUBLICATIONS

(56) References Cited

OTHER PUBLICATIONS

United Kingdom Examination Report dated Jun. 17, 2022, for Application No. GB2017036.1.
United Kingdom Combined Search and Examination Report dated Apr. 22, 2021, for Applicatoin No. GB2017036.1
Long, Andrew—"Evolutions in seismic azimuth: past, present and future," Geohorizons, Jul. 2009, pp. 1-14.
Lopez, Jorge L., et al.—"Fully Autonomous Marine Seismic Acquisition Systems for Rerservoir Monitoring," prepared for presentation during the 16th International Congress of the Brazilian Geophysical Society held in Rio de Janeiro, Brazil, Aug. 19-22, 2019, pp. 1-5.
Molteni, Daniele, et al.—"Use of distributed fibre-optic sensing for marine seismic measurements," Special Topic: Petroleum Geology and Basins, First Break (EAGE publication), vol. 34, Dec. 2016, pp. 53-60.
United Kingdom Combined Search and Examination Report dated Feb. 14, 2022, for Application No. GB2017036.1.
GB Examination Report in GB1813957.6 dated Nov. 8, 2021.
GB Examination Report in GB2100684.6 dated Jan. 25, 2022.
GB Examination Report in GB2203858.2 dated Apr. 1, 2022.
GB Examination Report in GB2100684.6 dated May 11, 2022.
GB Search Report in GB1813957.6 dated Jan. 24, 2019.
GB Search Report in GB2017061.9 dated Mar. 15, 2021.
GB Examination Report in GB2017061.9 dated Jul. 14, 2023.
International Search Report and Written Opinion in PCT/US2019/38035 dated Sep. 9, 2019.
International Search Report and Written Opinion in PCT/US2021/041957 dated Oct. 27, 2021.
A. Long, "Increasing Towed Streamer Survey Efficiency", Aug. 18, 2018, accessed by web https://www.pgs.com/globalassets/lechnical-library/tech-lib-pdfs/industry_insights_increasing-towed-streamer-survey-efficiency_aug2018_al.pdf, 15 pages.
Alfaro, et al., "Reducing Exploration Risk," Oilfield Review, Spring 2007 Issue, pp. 26-43 {Schlumberger, Spring 2007).
A.S. Long el. al, "Simultaneous Long Offset (SLO) Towed Streamer Seismic Acquisition", Jun. 2013, accessed by web https://www.pgs.com/globalassels/lechnical-library/whitepapers-library/2013june_pgs_long_etal_slo.pdf, 5 pages.
Brenders, Andrew et al., "Realistic Signal-to-Noise Ratios for Synthetic Seismic Data: Calibrating with Measured Noise and Applications to Waveform Inversion", SEG International Exposition and 86th Annual Meeting, pp. 3992-3996, copyright 2016 SEG, 5 pages.
Brenders, Drew et al., Realistic signal-to-noise ratios for synthetic seismic data: Calibrating with measured noise and applications to waveform inversion, Presentation, Society of Exploration Geophysicists, 49 pages.
Chemingui, et al., "Full Waveform Inversion of Simultaneous Long-Offset Data," presented at EAGE 81st Annual Conference & Exhibition 2019 (EAGE Jun. 3, 2019).
Chemingui, et al. "Full waveform inversion of simultaneous long-offset data," AEGC 2019: From Data to Discovery-Perth, Australia, pp. 1-6.
Cortland Company Brochure, Seismic Tow Cables, Umbilicals, Straps and Ropes, 7 pages.
Dellinger, Joe et al., "Challenges to extending the usable seismic bandwidth at the seafloor in the deep water GoM", SEG International Exposition and 86th Annual Meeting, pp. 66-70, Copyright 2016 SEG, 5 pages.
Dellinger, Joe et al., "Challenges to extending the usable seismic bandwidth at the seafloor in the deep water GoM", Presentation, Society of Exploration Geophysicists, 50 pages.
Dellinger, Joe et al., Wolfspar®, an "FWI-friendly" ultra-low-frequency marine seismic source, SEG International Exposition and 86th Annual Meeting, pp. 4891-4895, Copyright 2016 SEG, 5 pages.
Dellinger, Joe et al., Wolfspar®, an "FWI-friendly" ultra-low-frequency marine seismic source, Presentation, Society of Exploration Geophysicists, 47 pages.
Duey, "All in One, Vessel Deploys Dtreamers and Nodes while Provising Sources" E&P Nov. 2017.
Fromyr, Eivind, PGS, "Blended Acquisition—A potential step-change in geophysical flexibility and operational efficiency", SBGf, Fifteenth International Congress of the Brazilian Geophysical Society, pp. 768-771, 2019, 4 pages.
Lambert, et al., "Seismic Acquisition: Marine seismic survey positioning and control requirements evolve," Offshore Magazine, Mar. 1, 2003, 10 pages.
Long, et al. "Simultaneous Long Offset {SLO) Towed Streamer Seismic Acquisition," ASEG Extended Abstracts, J013:1, 1-4 {ASEG, Feb. 12, 2019).
Mensch, et al., "Acquisition of Long-Offset Data Offshore Gabon Shows How Synchronized Source Technology Adds Flexibility to Tailored Acquisition Solutions," First Break, vol. 34, Nov. 2016 {EAGE, Nov. 2016).
PGS Geophysical, "Multi-Vessel Configurations," https://www.pgs.com/marine-acquisition/lools-and-echniques/acquisition as downloaded Oct. 19, 2019, 6 pages.
PGS Article, "3D Spread Control", Control of streamer depth and lateral position, Sep. 6, 2018, accessed by web, https://www.pgs.com/marine-acquisition/tools-and-techniques/operational-efficiency/technology/slreamer-steering/, 3 pages.
PGS Article, "Ramform + Triple Source= Ultra HD3D", Jun. 1, 2018, accessed by web https://www.pgs.com/publications/feature-stories/ramform-plus-Iriple-source-equals-ultra-hd3d/, 5 pages.
Poole, et al., "Shot-to-shot directional designature using near-field hydrophone data," SEG Houston 2013 Annual Meeting, 5 pages.
Press Release, "SeaBird to enter into a strategic cooperation with PGS for deep water node seismic and to issue a NOK 240 million convertibel loan to PGS" (Cyprus Jan. 27, 2011).
Tapie, et al., "Optimizing Seismic Survey Design for Frontier Exploration in Cyprus Sall Basins," Seg I MPG nlemalional Meeting for Applied Geoscience and Energy {Aug. 31, 2023).
Tech Link, A Publication of PGS Geophysical, "Continuous Long Offset (CLO) Acquisition Technology", vol. 6 No.4, Apr. 2006, 4 pages.
Tham, et al., "A Cost-Effective and Efficient Solution for Marine Seismic Acquisition in Obstructed Areas—Acquiring Ocean-Bottom and Towed-Streamer Seismic Data with a Single Multipurpose Vessel," 2017 SEG Workshop: OBN/OBC Technologies and Applications (SEG 2017).
Unger, et al., "Exploration: Redefining Multi-Azimuth Seismic Acquisition," https://www.hartenergy.com/xclusives/redefining-multi-azimuth-seismic-acquisition-187435, May 2020, 5 pages.
Van Borselen, et al., "Simultaneous Long Offset {Slo) —A Case Study in Long Offset GeoStreamer Seismic Acquisition & Processing," 6th EAGE Saint Petersburg International Conference and Exhibition, vol. 2014, pp. 1-5 EAGE, Apr. 2014).
Vermeer, "Wide-Azimuth Towed Streamer Data Acquisition and Simultaneous Sources," The Leading Edge, vol. 28, ssue 8, pp. 260-268 {SEG, Aug. 2009).
Karlsson, et al., "Multivessel Surveying Reduces Seismic Cost, Acquisition Time," Offshore, vol. 51, No. 3, Abstract (Petroleum Publishing Co. Mar. 1, 1991).
U.S. Appl. No. 18/377,237 filed Oct. 5, 2023.
AU Examination Report in AU2019290138 dated Jan. 16, 2024.
International Search Report and Written Opinion in PCT/EP2023/078366 dated Feb. 2, 2024.

* cited by examiner

LONG-OFFSET ACQUISITION WITH IMPROVED LOW FREQUENCY PERFORMANCE FOR FULL WAVEFIELD INVERSION

CROSS REFERENCE TO RELATED APPLICATIONS

This application claims benefit of U.S. Provisional Patent Application Ser. No. 62/926,671, filed Oct. 28, 2019, entitled "Long Offset Acquisition with Improved Low Frequency Performance for Full Wavefield Inversion," which is incorporated herein by reference.

BACKGROUND

This disclosure is related generally to the field of marine surveying. Marine surveying can include, for example, seismic and/or electromagnetic surveying, among others. For example, this disclosure may have applications in marine surveying in which one or more sources are used to generate energy (e.g., wavefields, pulses, signals), and geophysical sensors—either towed or ocean bottom—receive energy generated by the sources and possibly affected by interaction with subsurface formations. Geophysical sensors may be towed on cables referred to as streamers. Some marine surveys locate geophysical sensors on ocean bottom cables or nodes in addition to, or instead of, streamers. The geophysical sensors thereby collect survey data (e.g., seismic data, electromagnetic data) which can be useful in the discovery and/or extraction of hydrocarbons from subsurface formations.

Marine surveying utilizes various surveying configurations and/or navigation plans to improve data sets, resulting in better data coverage, consistency, signal-to-noise ratio, robustness, redundancy, variety, and cost-efficiency, among other benefits. Some marine surveys deploy sources and receivers at long offsets to better acquire certain types of survey data. For example, long offsets may be beneficial for sub-salt and pre-salt imaging. Such long-offset surveys typically utilize ocean bottom cables or nodes. As another example, some very-low-frequency (e.g., as low as 1.6 Hz) sources may utilize receivers at long offsets (e.g., about 8 km-about 20 km) to acquire survey data optimized for full-waveform inversion (FWI).

Distributed sensing systems utilizing fiber optic technology have been developed to provide distributed strain sensing. For example, distributed strain sensing may use fiber optic cables as sensing elements, and measurements may be made (e.g., based on Rayleigh scattering) using an attached optoelectronic device. Such a system may allow acoustic frequency strain signals to be detected over large distances.

The results of marine surveys that acquire survey data for FWI may be improved by utilizing low-frequency data having good signal-to-noise ratio. Improved equipment and methods for acquiring low-frequency data, low-noise data, and/or long-offset data would be beneficial.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, which may apply to other equally effective embodiments.

DETAILED DESCRIPTION

Figure 1:
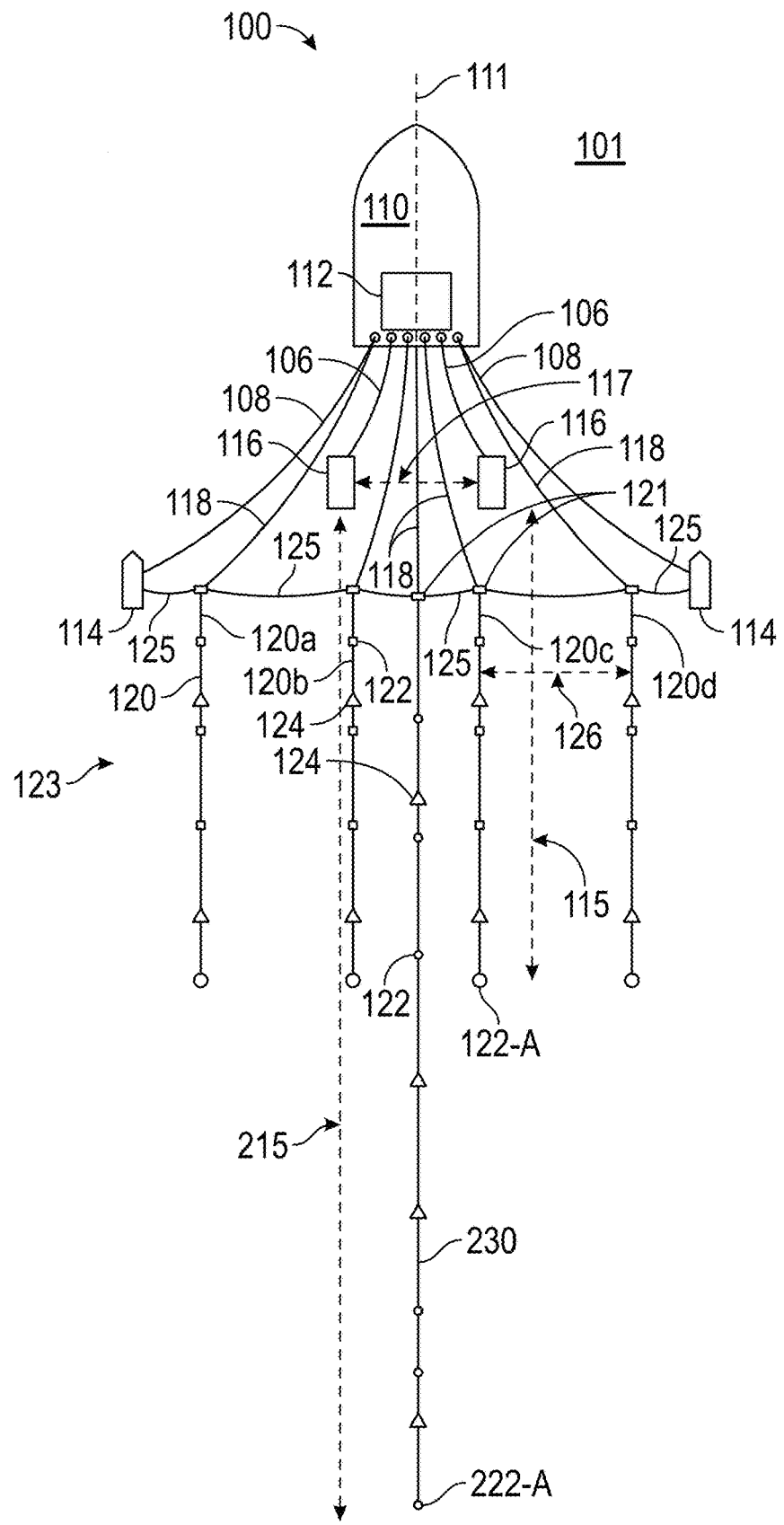
FIG. 1 illustrates an exemplary embodiment of a marine geophysical survey system configured for long-offset acquisition.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

"Axial" or "axial direction" shall mean, for an object or system having a canonical axis, a direction along a proximal portion of the axis.

"Lateral" or "lateral direction" shall mean, for an object or system having a canonical axis, a direction perpendicular to a proximal portion of the axis. Often, "lateral direction" is understood to be at a fixed depth.

"Inline" or "inline direction" shall mean, for equipment towed by a vessel, a direction along (or parallel to) the path traversed by the vessel.

"Crossline" or "crossline direction" shall mean, for equipment towed by a vessel, a fixed-depth direction perpendicular to the path traversed by the vessel.

"Offset" shall mean the nominal inline distance between the source and the receiver.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Streamer" shall mean an apparatus (e.g., a cable) that may be towed behind a survey vessel to detect and/or measure geophysical signals (e.g., seismic signals, electromagnetic signals). A streamer may include detectors, sensors, receivers, and/or other structures (e.g., hydrophones, geophones, electrodes) positioned along or within the streamer and configured to detect and/or measure the geophysical signals.

"Source vessel" shall mean a watercraft, manned or unmanned, that is configured to carry and/or tow, and in practice does carry and/or tow, one or more geophysical sources. Unless otherwise specified, source vessels should be understood to not carry or tow one or more geophysical streamers.

"Streamer vessel" shall mean a watercraft, manned or unmanned, that is configured to tow, and in practice does carry and/or tow, one or more geophysical streamers. Unless otherwise specified, streamer vessels should be understood to not carry or tow one or more geophysical sources.

"Survey vessel" shall mean a watercraft, manned or unmanned, that is configured to tow, and in practice does carry and/or tow, one or more geophysical sources and/or one or more geophysical streamers.

"Submerged" shall mean that an object resides fully below the surface of the water. If any portion of the object resides above the surface, then the object shall not be considered submerged. "Submerges" shall mean that an object becomes submerged.

"Buoyancy" of an object shall refer to buoyancy of the object taking into account any weight supported by the object.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Port" and "starboard" shall mean the left and right, respectively, direction or end of an object or system when facing in the intended primary direction of travel of the object or system.

"Obtaining" data or information shall mean any method or combination of methods of acquiring, collecting, synthesizing, designing, or accessing data or information, including, for example, directly measuring or sensing a physical property, receiving transmitted data, selecting data from a group of physical sensors, identifying data in a data record, generating data or information manually and/or programmatically, and retrieving data or information from one or more data libraries.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the surveying operation. As another example, the two or more events may occur during time periods that overlap by about 40% to about 100% of either period.

"Optical fiber" shall mean a flexible fiber capable of transmitting light between the two ends of the fiber. An optical fiber may be made up of multiple segments, joined end-to-end, each segment itself being a flexible fiber capable of transmitting light signals between the two ends of the segment. As such, segments may be joined by passive splices that transmit light from one segment to the next, or by active splices that amplify or modulate light from one segment to the next.

"Optical fiber bundle" shall mean a plurality of optical fibers in close radial proximity and generally spanning the same end-to-end axial path. The optical fibers of a bundle may be in contact with one another. The optical fibers of a bundle may be wrapped around one another, or around another piece of equipment that generally spans the same end-to-end axial path. The optical fibers of a bundle may be secured together to reduce relative motion between one another.

"Fiber optic component" shall mean an optical fiber, an optical fiber bundle, or a part thereof.

If there is any conflict in the usages of a word or term in this specification and one or more patent or other documents that may be incorporated herein by reference, the definitions that are consistent with this specification should be adopted for the purposes of understanding this disclosure.

The present disclosure generally relates to marine seismic and/or electromagnetic survey methods and apparatuses, and, at least in some embodiments, to novel surveying system configurations, and their associated methods of use. At least one embodiment of the present disclosure can include a geophysical survey system including one or more streamers and a fiber optic component in and/or on a streamer. At least one embodiment of the present disclosure utilizes the fiber optic component for Distributed Acoustic Sensing (DAS). At least one embodiment can provide long-offset data using a towed streamer for improved low-frequency data acquisition. In some embodiments, standard surveying configurations may be modified for improved low-frequency data acquisition (e.g., by utilizing DAS streamers, by varying streamer depth, by varying offsets, and/or by varying group lengths). This improved low-frequency data may improve results from full waveform inversion (FWI) over that from processing and/or analyzing data collected with conventional technology. Embodiments of the present disclosure can thereby be useful in the discovery and/or extraction of hydrocarbons from subsurface formations.

In some embodiments, long-offset (e.g., greater than about 10 km offset) surveying is utilized for FWI. In some embodiments, FWI may utilize data that is recorded at low frequencies and/or with low noise. Some embodiments may advantageously improve signal-to-noise ratio (S/N) of recorded data by adding data from selected recording groups together and/or towing recording sensors at various depths. For example, depending on the recording frequencies of interest, a different towing depth may be utilized, and/or a different recording group length may be selected.

In some embodiments, a DAS streamer includes an optical fiber (and/or assembly of optical fiber elements) disposed along a portion and/or the entirety of the length of the streamer. The DAS streamer may also include, or be coupled to, a light source and light analysis equipment. During operation, light energy (such as a laser pulse) from the light source propagates through the optical fiber. Backscattered light may be detected and/or analyzed by the light analysis equipment. For example, variations in amplitude and/or frequency of the backscattered light may be analyzed to determine location-specific measurements of acoustic amplitude, phase, and/or frequency. Since an acoustic measurement is made at each measurement location, a synthetic receiver may be thought to be disposed at each measurement location. A DAS streamer may thereby provide simultaneous measurement of acoustic amplitude, phase, and/or frequency at a multitude of locations (e.g. receiver sampling density of about 1 per meter to about 1 per 30 m) along the optical fiber (e.g., 8,000 independent measurement points for an 8 km streamer). For example, the acoustic measurements may provide a synthetic receiver density of about 1 per meter to about 1 per 2 m. In some embodiments, the measurement locations may be distributed with regular spacing, such as a receiver sampling density of about 1 per cm to about 1 per 30 m. In some embodiments, the measurement locations may be distributed with varying and/or irregular spacing along the length of the DAS streamer. In some embodiments, DAS technology makes it possible to build thin streamers (e.g., about 15 mm to about 25 mm diameter, compared to about 50 mm to about 90 mm for a standard streamer) with a length of about 8 km to about 50 km, or about 20 km to about 40 km. In some embodiments, DAS streamers may be utilized in combination with conventional streamers to achieve long-offset data, which thereby provides long-offset data for FWI to construct a good velocity model.

In some embodiments, one or more DAS streamers may be deep-towed (e.g., towed at depths greater than 30 m, such as about 100 m), while a standard survey spread may be towed at standard depths (e.g., about 10 m to about 30 m). In some embodiments, the one or more DAS streamers may have a length of about 8 km to about 50 km, or about 20 km to about 40 km. In some embodiments, due to the small diameter of the DAS streamer, the drag may be minimal, even at greater streamer lengths. For example, the total drag force may be a combination of the "form drag" and the "skin friction drag." The form drag is proportional to the cross-sectional surface area of the streamer (increases quadratically with diameter). The skin friction drag is proportional to the surface area of the streamer (increases linearly with diameter and linearly with length). Therefore, for a DAS streamer with a diameter half of the size of a standard streamer, but with four-times the length, the total drag force will be less than 25% of that for the standard streamer.

In some embodiments, although being much longer than a standard streamer, a DAS streamer, having a small diameter, may fit on a standard streamer reel for storage, transport, and/or deployment/retrieval thereby further saving costs.

FIG. 1 illustrates an exemplary embodiment of a marine geophysical survey system 100 configured for long-offset acquisition. System 100 includes survey vessel 110 that may be configured to move along a surface of body of water 101 (e.g., an ocean or a lake). In FIG. 1, survey vessel 110 tows two signal sources 116, four standard streamers 120, and one long-offset streamer 230. As used herein, the term "signal source" or "source element" refers to an apparatus that is configured to emit a signal (e.g., acoustic, electromagnetic, etc.) that may be at least partially reflected from one or more subsurface structures, and then detected and/or measured. For example, detectors, sensors, receivers, and/or other structures (e.g., hydrophones, geophones, electrodes, etc.) positioned along or within standard streamers 120 and/or long-offset streamer 230 may detect and/or measure the reflected signal. System 100 may thereby acquire survey data. As used herein, "survey data" generally refers to data utilized by and/or acquired during a survey, including detected signals, seismic data, electromagnetic data, pressure data, particle motion data, particle velocity data, particle acceleration data, clock data, position data, depth data, speed data, temperature data, etc. The standard streamers 120 may be of conventional length. For example, each standard streamer 120 may be about 5 km to about 10 km long, or in some embodiments about 6 km to about 8 km long. System 100 may utilize signal sources 116 with standard streamers 120 to acquire standard-offset survey data (i.e., data acquired at offsets less than about 10 km).

Signal sources 116 are shown in FIG. 1 being towed by survey vessel 110 using source cables 106. Each of signal sources 116 may include sub-arrays of multiple individual signal sources. For example, signal source 116 may include a plurality of seismic sources, such as air guns or marine vibrators, and/or electromagnetic signal sources. As illustrated, the two signal sources 116 are distributed about a midline 111 of survey vessel 110. The midline 111 represents the tow path along the centerline of the survey vessel 110. As illustrated, the two signal sources 116 are distanced from one another by a nominal crossline source separation 117, which may be greater than, equal to, or less than nominal crossline streamer spacing 126. The signal sources 116 may be independently activated, activated simultaneously, activated in a sequential pattern, and/or activated randomly with respect to one another. In some embodiments (not shown), signal sources 116 may be distributed asymmetrically with respect to the midline 111 of survey vessel 110.

Standard streamers 120 may include a variety of receivers 122. Receivers 122 may include seismic receivers or sensors, such as hydrophones, pressure sensors, geophones, particle motion sensors, and/or accelerometers. Receivers 122 may include electromagnetic sensors, such as electrodes or magnetometers. Receivers 122 may include any suitable combination of these and/or other types of geophysical sensors. Standard streamers 120 may further include streamer steering devices 124 (also referred to as "birds") which may provide controlled lateral and/or vertical forces to standard streamers 120 as they are towed through the water, typically based on wings or hydrofoils that provide hydrodynamic lift. Standard streamers 120 may further include tail buoys (not shown) at their respective back ends. The number and distribution of receivers 122, streamer steering devices 124, and tail buoys along each standard streamer 120 may be selected in accordance with manufacturing and operational circumstances or preferences.

As illustrated in FIG. 1, standard streamers 120 are coupled to survey vessel 110 via standard lead-in lines 118 and lead-in terminations 121. Standard lead-in lines 118 may generally be about 750 m to about 1500 m, or more specifically about 1000 m to about 1100 m in total length. Typically, about half of the total length of standard lead-in line 118 will be in the water. For example, about 400 m-500 m of standard lead-in line 118 may be in the water during operation. Lead-in terminations 121 may be coupled to or associated with spreader lines 125 so as to nominally fix the lateral positions of standard streamers 120 with respect to each other and with respect to a centerline of survey vessel 110. Standard streamers 120a-120d may be nominally fixed in lateral positions with respect to each other in order to form a standard-offset survey spread 123 (e.g., a narrow-azimuth spread, and/or a 3D acquisition spread) to collect standard-offset survey data as survey vessel 110 traverses the surface of body of water 101. In a standard-offset survey spread 123, the nominal crossline streamer spacing 126 may range from about 25 m to about 100 m, or in some embodiments about 100 m. As shown, system 100 may also include two paravanes 114 coupled to survey vessel 110 via paravane tow lines 108. Paravanes 114 may be used to provide a streamer separation force for standard-offset survey spread 123.

As illustrated in FIG. 1, standard-offset survey spread 123 may be towed at a nominal depth of about 10 m to about 30 m, or more particularly about 25 m. For example, the speed of survey vessel 110, length of standard lead-in lines 118, angle of paravanes 114, length of spreader lines 125, and/or any steering devices, tail buoys, and/or depth control buoys may be configured and/or operated to tow the standard streamers 120 at a nominal depth of about 10 m to about 30 m. It should be appreciated that streamers are generally towed at a nominal depth that may vary (e.g., by about ±5%) along the length of the streamer due to environmental factors (e.g., currents, water temperatures).

In various embodiments, a geophysical survey system may include any appropriate number of towed signal sources 116 and standard streamers 120. For example, FIG. 1 shows two signal sources 116 and four standard streamers 120. It should be appreciated that standard-offset survey spread 123 commonly includes as few as 2 and as many as 24 or more standard streamers 120, or in some embodiments ten standard streamers 120. In one embodiment, for example, survey vessel 110 may tow eighteen or more standard streamers 120. A geophysical survey system with an increased number of signal sources 116 and/or standard streamers 120 may allow for more survey data to be collected and/or a wider standard-offset survey spread 123 to be achieved. The width of a survey spread may be determined by the crossline streamer spacing 126 and the number of streamers in the survey spread. For example, standard-offset survey spread 123 may have a width of about 300 m to about 3 km, or in some embodiments about 900 m.

Geodetic position (or "position") of the various elements of system 100 may be determined using various devices, including navigation equipment such as relative acoustic ranging units and/or global navigation satellite systems (e.g., a global positioning system (GPS)).

Survey vessel 110 may include equipment, shown generally at 112 and for convenience collectively referred to as a "recording system." Recording system 112 may include devices such as a data recording unit (not shown separately) for making a record (e.g., with respect to time) of signals collected by various geophysical sensors. For example, in various embodiments, recording system 112 may be configured to record reflected signals detected or measured by receivers 122 while survey vessel 110 traverses the surface of body of water 101. Recording system 112 may also include a controller (not shown separately), which may be configured to control, determine, and record, at selected times, navigation and/or survey data, including the geodetic positions of: survey vessel 110, signal sources 116, standard streamers 120, receivers 122, etc. Recording system 112 may also include a communication system for communicating between the various elements of system 100, with other vessels, with on-shore facilities, etc.

As illustrated, standard-offset survey spread 123 has aft-most receivers 122-A. For example, each aft-most receiver 122-A may be at or near the aft-most end of a standard streamer 120. In the illustrated embodiment, an aft-most receiver 122-A is aft of each illustrated streamer steering device 124, but other configurations are possible. The inline distance between signal source 116 and aft-most receiver 122-A is the longest offset 115 of standard-offset survey spread 123. Typically, conventional marine geophysical survey spreads may have longest offsets of about 5 km to about 10 km, or in some embodiments about 6 km to about 8 km.

System 100 also includes a long-offset streamer 230. For example, each standard streamer 120 may be about 5 km to about 10 km long, while long-offset streamer 230 may be about 8 km to about 50 km long, or in some embodiments about 20 km to about 40 km long. As illustrated, long-offset streamer 230 is coupled to survey vessel 110 via a standard lead-in line 118 and a lead-in termination 121. In some embodiments, the lead-in termination 121 of long-offset streamer 230 may be coupled to or associated with spreader lines 125 so as to nominally fix the lateral positions of long-offset streamers 230 with respect to standard streamers 120. As with standard streamers 120, long-offset streamer 230 may include receivers 122, streamer steering devices 124, and tail buoys. The number and distribution of receivers 122, streamer steering devices 124, and tail buoys along long-offset streamer 230 may be selected in accordance with manufacturing and operational circumstances or preferences. In some embodiments, receivers 122 on long-offset streamer 230 may be low-frequency seismic receivers configured to detect and/or measure low-frequency seismic signals (e.g., about 1 Hz to about 30 Hz, or about 1 Hz to about 8 Hz). In some embodiments, system 100 may have an aft-most receiver 222-A providing a longest offset 215 of about 8 km to about 50 km, or in some embodiments about 20 km to about 40 km. System 100 may utilize signal sources 116 with long-offset streamer 230 to acquire long-offset survey data (i.e., data acquired at offsets greater than about 10 km).

As would be appreciated by one of ordinary skill in the art with the benefit of this disclosure, long streamer cables (e.g., longer than about 10 km) can pose several challenges. For example, the axial strength of a standard streamer cable may not be sufficient to withstand the towing forces incurred by a long streamer cable, leading to breakage and or separation of portions of the streamer. As another example, increasing the length of streamer cables may increase drag, and thereby increase operational costs. As another example, drag may also increase quadratically with cable width or diameter. As another example, the capacity of data buses in a standard streamer cable may not be sufficient for the data expected from a long streamer cable. For example, a long streamer cable may have many more receivers than a standard streamer cable, each acquiring data to be carried by the data buses. As another example, data signals along data buses in long streamer cables may require repeaters to boost the signal along the length of the long streamer cable. As another example, the capacity of power lines and/or power sources in a standard streamer cable may not be sufficient for the power demands expected from a long streamer cable. Moreover, low-frequency/long-offset data may be less useful for conventional imaging, especially 3D imaging, compared to high-frequency data.

In some embodiments, long-offset streamer 230 may use DAS technology to mitigate challenges of conventional long streamer cables. For example, long-offset streamer 230 may be a DAS streamer. As a DAS streamer, long-offset streamer 230 may include an optical fiber (and/or assembly of optical fiber elements) disposed along a portion and/or the entirety of the length of the streamer. During operation, light energy (such as a laser pulse) from a light source may propagate through the optical fiber. Backscattered light may be detected and/or analyzed with light analysis equipment. As a DAS streamer, long-offset streamer 230 may thereby provide simultaneous measurement of acoustic amplitude, phase, and/or frequency at a multitude of locations (e.g. receiver sampling density of about 1 per meter) along the optical fiber (e.g., 8,000 independent measurement points for an 8 km streamer). For example, the acoustic measurements may provide a synthetic receiver density of about 1 per meter to about 1 per 2 m. In some embodiments, the measurement locations may be distributed with regular spacing, such as a receiver sampling density of about 1 per cm to about 1 per 30 m. In some embodiments, the measurement locations may be distributed with varying and/or irregular spacing along the length of the DAS streamer. In some embodiments, the DAS streamer may be utilized as an acoustic phased array detector. In some embodiments, the DAS streamer may be thin (e.g., about 15 mm to about 25 mm diameter) with a length of about 8 km to about 50 km, or about 20 km to about 40 km. For example, in some embodiments, the length of the DAS streamer may be about 10 km, about 15 km, about 18 km, or about 20 km.

In some embodiments, as a DAS streamer, long-offset streamer 230 may include thereon or therein one or more fiber optic components. For example, a fiber optic component may be located at the center of the core of the DAS streamer. As another example, the DAS streamer may include one or more layers and a variety of segments, devices, and equipment, such as a jacket, buoyancy fill material, and core equipment (e.g., a plurality of insulated electrical conductors and/or optical fibers to carry power or communication between the recording system 112 and various streamer components). As another example, various elements of the core equipment may be helically wound so that elongation of the DAS streamer in the axial direction does not produce substantial corresponding axial strain in the core equipment. As another example, a DAS streamer may have fiber optic components located at or near the center of the core of the DAS streamer to reduce the risk of damage to the fiber optic component during handling, deployment and use, and/or to reduce the effect of any torque on the DAS streamer that may change the length of the fiber optic component independent of changes to the length of the DAS streamer. As another example, the DAS streamer may have fiber optic components located within the DAS streamer (for example, within the jacket), though not at or near the center of the core of the DAS streamer. As another example, particularly with retrofit equipment, the DAS streamer may have fiber optic components located on the surface of the DAS streamer (for example, outside of the jacket). As another example, the fiber optic components may span the length of the DAS streamer and/or any segments thereof. For example, a segment of a fiber optic component may be between about 25 m and about 100 m long. As a DAS streamer, long-offset streamer 230 may have fiber optic components positioned along the DAS streamer in a variety of other configurations to serve various operational purposes.

Figure 2:
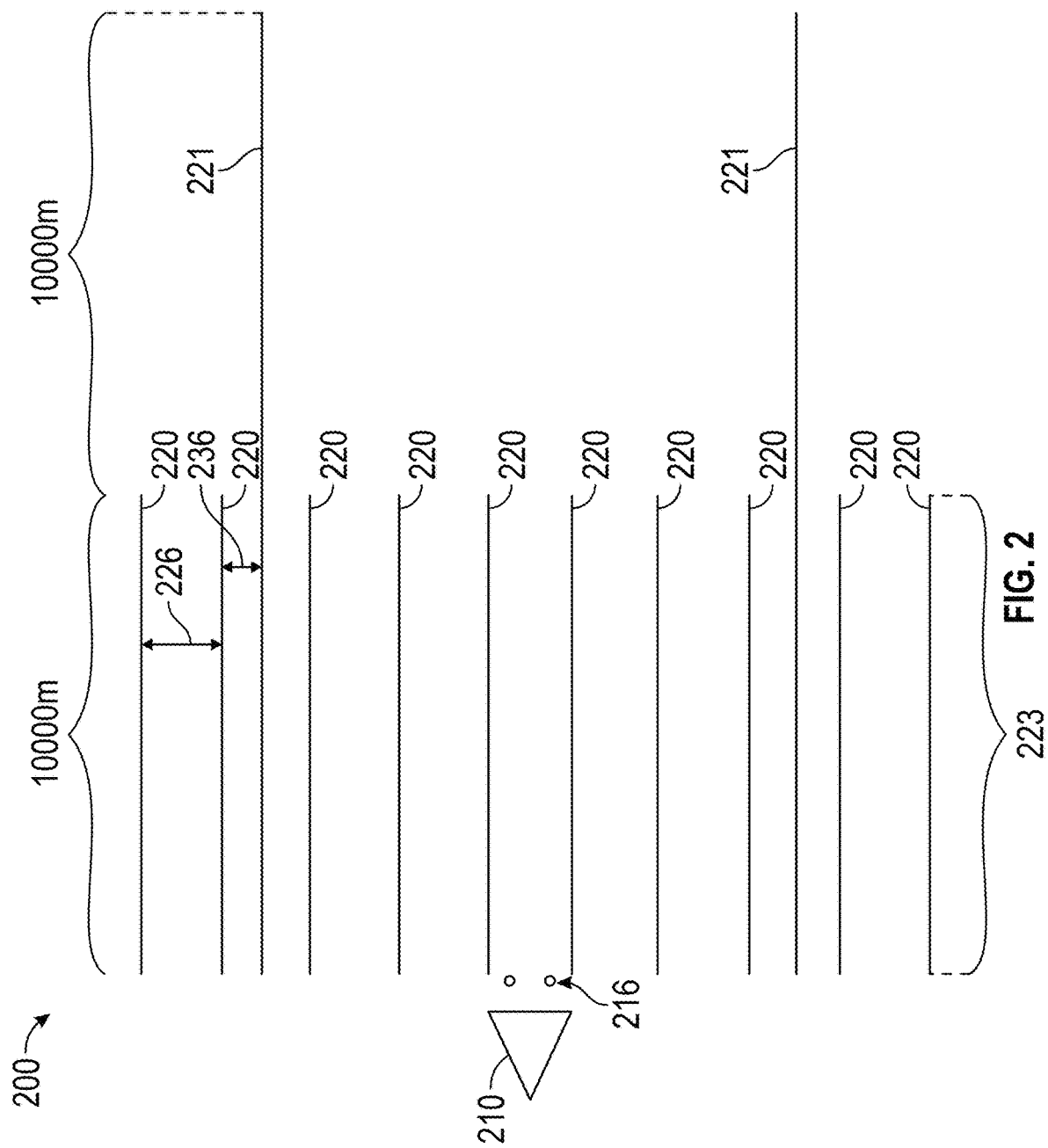
FIG. 2 illustrates another exemplary embodiment of a marine geophysical survey system configured for long-offset acquisition.

FIG. 2 illustrates another exemplary embodiment of a marine geophysical survey system 200 configured for long-offset acquisition. In many aspects, system 200 is configured similarly to system 100. However, system 200 includes two DAS streamers 221. Similar to system 100 of FIG. 1, survey vessel 210 tows one or more signal source(s) 216 and a standard-offset survey spread 223. Standard-offset survey spread 223 may be configured similarly to the standard-offset survey spread 123 of FIG. 1. The standard streamers 220 of standard-offset survey spread 223 may be configured similarly to standard streamers 120 of FIG. 1. As illustrated, the standard streamers 220 of standard-offset survey spread 223 have lengths of about 10 km. In some embodiments, the standard streamers 220 of standard-offset survey spread 223 may have lengths of about 5 km to about 10 km long, or in some embodiments about 6 km to about 8 km long. Standard-offset survey spread 223 may be towed at standard streamer towing depths (e.g., about 10 m to about 30 m). The nominal crossline streamer spacing 226 for standard-offset survey spread 223, may range from about 25 m to about 200 m, or in some embodiments about 100 m. System 200 may utilize signal sources 216 with standard-offset survey spread 223 to acquire standard-offset survey data.

As illustrated in FIG. 2, survey vessel 210 also tows two DAS streamers 221. As illustrated, the DAS streamers 221 have lengths of about 20 km. As illustrated, the DAS streamers 221 may be towed proximal the penultimate port-most and/or penultimate starboard-most standard streamers 220 of standard-offset survey spread 223. Consequently, the DAS streamers 221 may be configured to acquire wide-azimuth data. As used herein, the terms "narrow azimuth" and "wide azimuth" should be interpreted in light of common industry usage. For example, "narrow azimuth" tends to reflect survey configurations capable of acquiring data at azimuth angles of less than about 20° at most of the applicable offsets. "Wide offset" tends to reflect survey configurations capable of acquiring data at azimuth angles of greater than about 20° at most of the applicable offsets. In some embodiments, the DAS crossline spread separation 236 (i.e., the nominal crossline distance between a DAS streamer 221 and a standard streamer 220) may be from about 0 m (e.g., nominally aligned with the penultimate port-most or penultimate starboard-most standard streamer 220) to about 100 m, or in some embodiments about 50 m. In some embodiments, each DAS streamer 221 may be towed nominally equidistant (e.g., same DAS crossline spread separation 236 on either side of DAS streamer 221) between two of the standard streamers 220 of standard-offset survey spread 223.

It should be appreciated that other towing configurations may also provide acquisition of wide-azimuth data with DAS streamers 221. For example, the DAS streamers 221 may be towed near or at the same crossline position as the port-most and/or starboard-most standard streamer 220. As another example, the DAS streamers 221 may be towed at crossline separations from the midline of the survey vessel 210 of ⅛ of the spread width, ⅙ of the spread width, ¼ of the spread width, or ⅓ of the spread width. A person of ordinary skill in the art with the benefit of this disclosure would recognize other suitable towing configurations that provide acquisition of wide-azimuth data with DAS streamers 221.

In some embodiments, the DAS streamers 221 are towed at depths greater than about 30 m. It is currently believed that towing DAS streamers 221 at greater depths than the standard streamers 220 may provide improved low-frequency data (e.g., data having a higher signal-to-noise ratio). This improved low-frequency data may improve results from full waveform inversion (FWI) over processing data collected with conventional technology. System 200 may utilize signal sources 216 with DAS streamers 221 to acquire low-frequency, long-offset survey data. In some embodiments (not shown), both or either DAS streamer 221 may be towed by a separate long-offset streamer vessel (e.g., a narrow-azimuth streamer vessel, a remotely operated underwater vessel).

In some embodiments, acquiring survey data with system 200 may advantageously provide data having very long offsets, which may be especially useful for FWI. In some embodiments, acquiring survey data with system 200 may advantageously provide long-offset data having improved S/N. In some embodiments, the DAS streamers 221 may have a smaller diameter than that of a conventional streamer. Consequently, even the added length of DAS streamers 221 over that of conventional streamers may not result in any or much additional drag while operating system 200. Likewise, as there would be no significant increase in drag, system 200 may acquire long-offset data with a single vessel (i.e., survey vessel 210). System 200 may have lower operational costs and reduced operational risks than would be the case with conventional streamers (e.g., conventional streamers operating with additional drag and thereby necessitating additional streamer vessels). Moreover, the small diameter of DAS streamers 221 may allow the use of standard streamer reels for storage, transport, and deployment/retrieval, thereby further saving costs.

Figure 3:
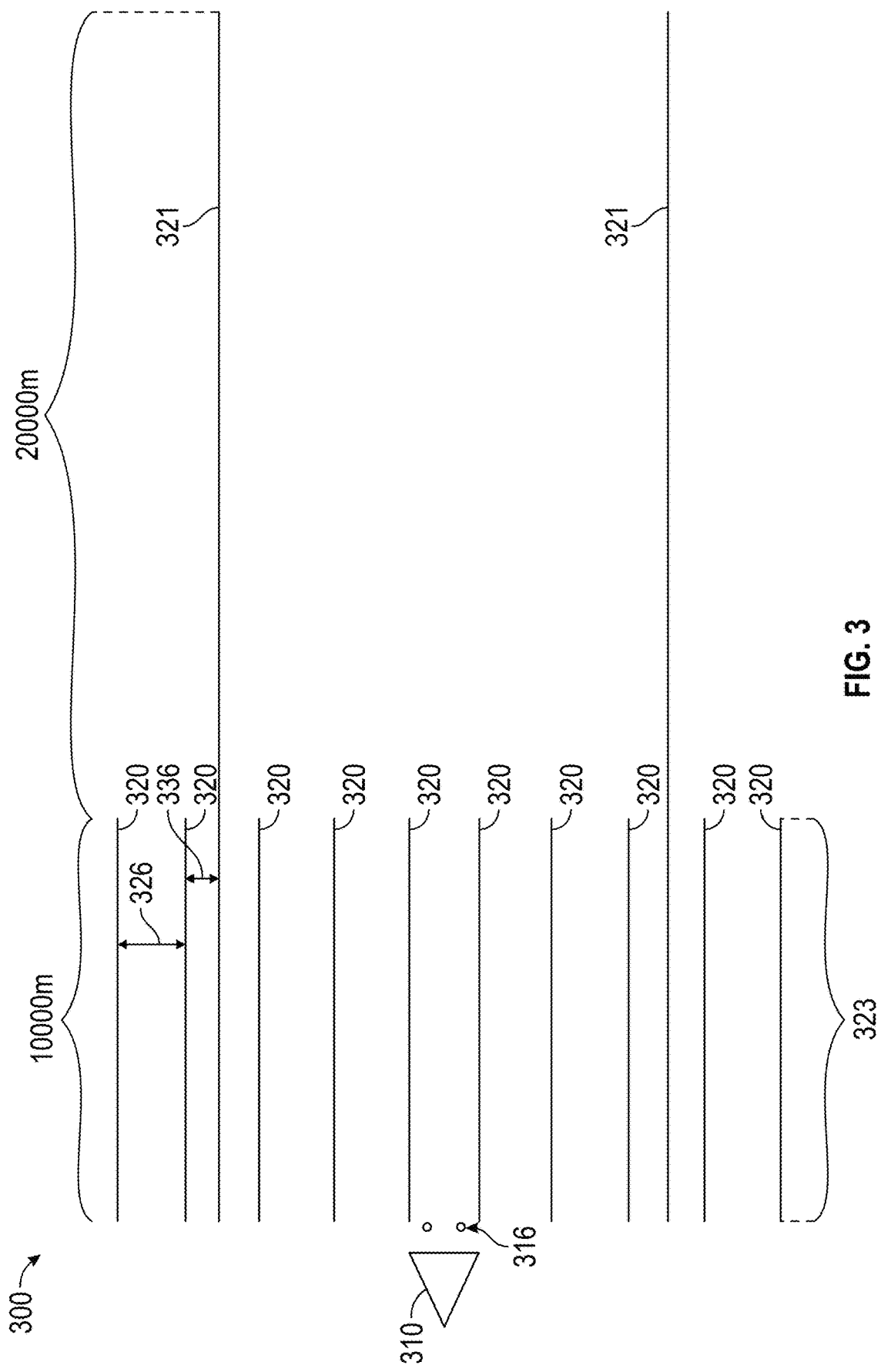
FIG. 3 illustrates another exemplary embodiment of a marine geophysical survey system configured for long-offset acquisition.

FIG. 3 illustrates another exemplary embodiment of a marine geophysical survey system 300 configured for long-offset acquisition. In many aspects, system 300 is configured similarly to systems 100 and 200. However, system 300 includes two very long DAS streamers 321. Similar to systems 100 and 200, survey vessel 310 tows one or more source(s) 316 and a standard-offset survey spread 323. Standard-offset survey spread 323 may be configured similarly to the standard-offset survey spreads 123 and 223. The standard streamers 320 of standard-offset survey spread 323 may be configured similarly to standard streamers 120 and 220. As illustrated, the standard streamers 320 of standard-offset survey spread 323 have lengths of about 10 km. In some embodiments, the standard streamers 320 of standard-offset survey spread 323 may have lengths of about 5 km to about 10 km long, or in some embodiments about 6 km to about 8 km long. Standard-offset survey spread 323 may be towed at standard streamer towing depths (e.g., about 10 m to about 30 m). The nominal crossline streamer spacing 326 for standard-offset survey spread 323, may range from about 25 m to about 200 m, or in some embodiments about 100 m. System 300 may utilize signal sources 316 with standard-offset survey spread 323 to acquire standard-offset survey data.

As illustrated in FIG. 3, survey vessel 310 also tows two DAS streamers 321. As illustrated, the DAS streamers 321 have lengths of about 30 km. As illustrated, the DAS streamers 321 may be towed proximal the penultimate port-most and/or penultimate starboard-most standard streamers 320 of standard-offset survey spread 323. Consequently, the DAS streamers 321 may be configured to acquire wide-azimuth data. In some embodiments, the DAS crossline spread separation 336 (i.e., the nominal crossline distance between a DAS streamer 321 and a standard streamer 320) may be from about 0 m (e.g., nominally aligned with the penultimate port-most or penultimate starboard-most standard streamer 320) to about 100 m, or in some embodiments about 50 m. In some embodiments, each DAS streamer 321 may be towed nominally equidistant (e.g., same DAS crossline spread separation 336 on either side of DAS streamer 321) between two of the standard streamers 320 of standard-offset survey spread 323.

In some embodiments, the DAS streamers 321 are towed at depths greater than about 30 m. System 300 may utilize signal sources 316 with DAS streamers 321 to acquire low-frequency, long-offset survey data. In some embodiments (not shown), both or either DAS streamer 321 may be towed by a separate long-offset streamer vessel (e.g., a narrow-azimuth streamer vessel, a remotely operated underwater vessel).

In some embodiments, acquiring survey data with system 300 may advantageously provide data having very long offsets, which may be especially useful for FWI. In some embodiments, acquiring survey data with system 300 may advantageously provide long-offset data having improved S/N. In some embodiments, the DAS streamers 321 may have a smaller diameter than that of a conventional streamer. Consequently, even the added length of DAS streamers 321 over that of conventional streamers may not result in any or much additional drag while operating system 300. Likewise, as there would be no significant increase in drag, system 300 may acquire long-offset data with a single vessel (i.e., survey vessel 310). System 300 may then have lower operational costs and reduced operational risks than would be the case with conventional streamers (e.g., conventional streamers operating with additional drag and thereby necessitating additional streamer vessels). Consequently, in comparison to surveying systems with conventional streamers, system 300 with very long DAS streamers may reduce the amount of equipment in the water, reduce the vessel effort, and/or reduce the environmental impact.

Figure 4:
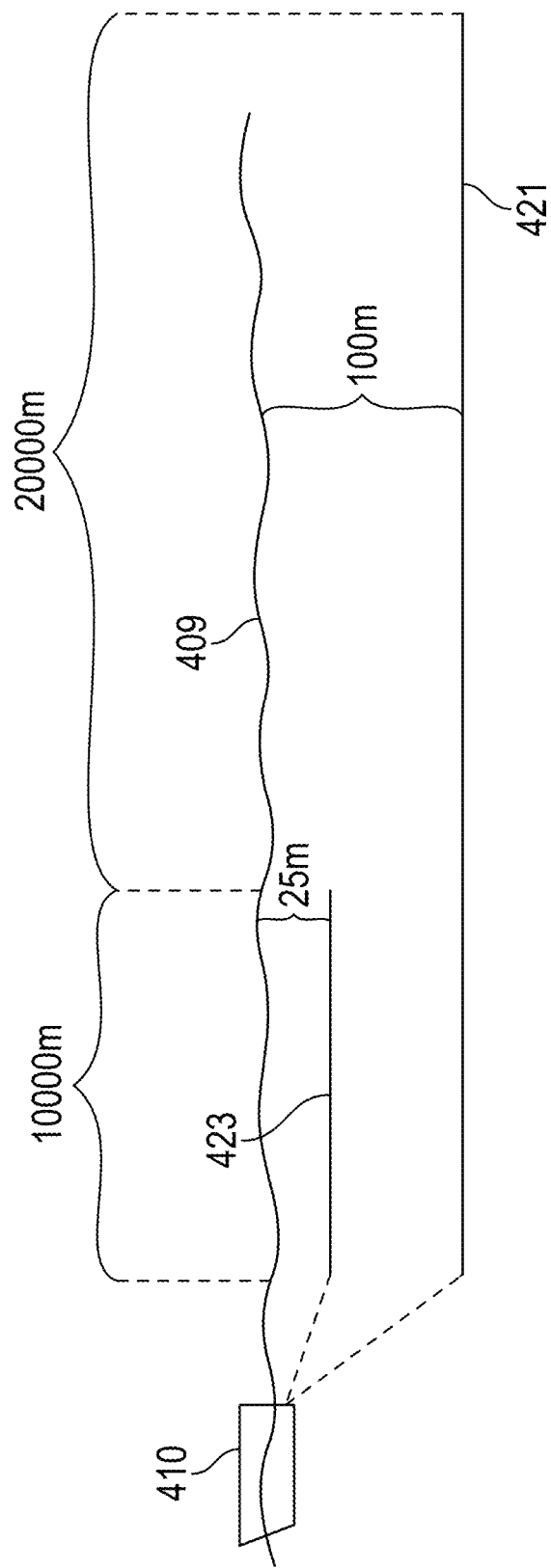
FIG. 4 illustrates another exemplary embodiment of a marine geophysical survey system configured for long-offset acquisition.

FIG. 4 illustrates another exemplary embodiment of a marine geophysical survey system 400 configured for long-offset acquisition. FIG. 4 specifically illustrates an exemplary nominal depth profile for a long-offset surveying configuration, which could be utilized with any of systems 100, 200, or 300. As illustrated, survey vessel 410 tows a standard-offset survey spread 423 and one or more DAS streamer(s) 421 below water surface 409. As illustrated, the standard streamers of standard-offset survey spread 423 have lengths of about 10 km. As illustrated, the DAS streamers 421 have lengths of about 30 km.

As illustrated in FIG. 4, standard-offset survey spread 423 may be towed at a nominal depth of about 10 m to about 30 m, or more particularly about 25 m. As illustrated, the one or more DAS streamers 421 may be towed at a nominal depth of greater than about 30 m, or more particularly about 100 m. It should be appreciated that streamers are generally towed at a nominal depth that may vary (e.g., by about ±5%) along the length of the streamer due to environmental factors (e.g., currents, water temperatures).

Figure 5:
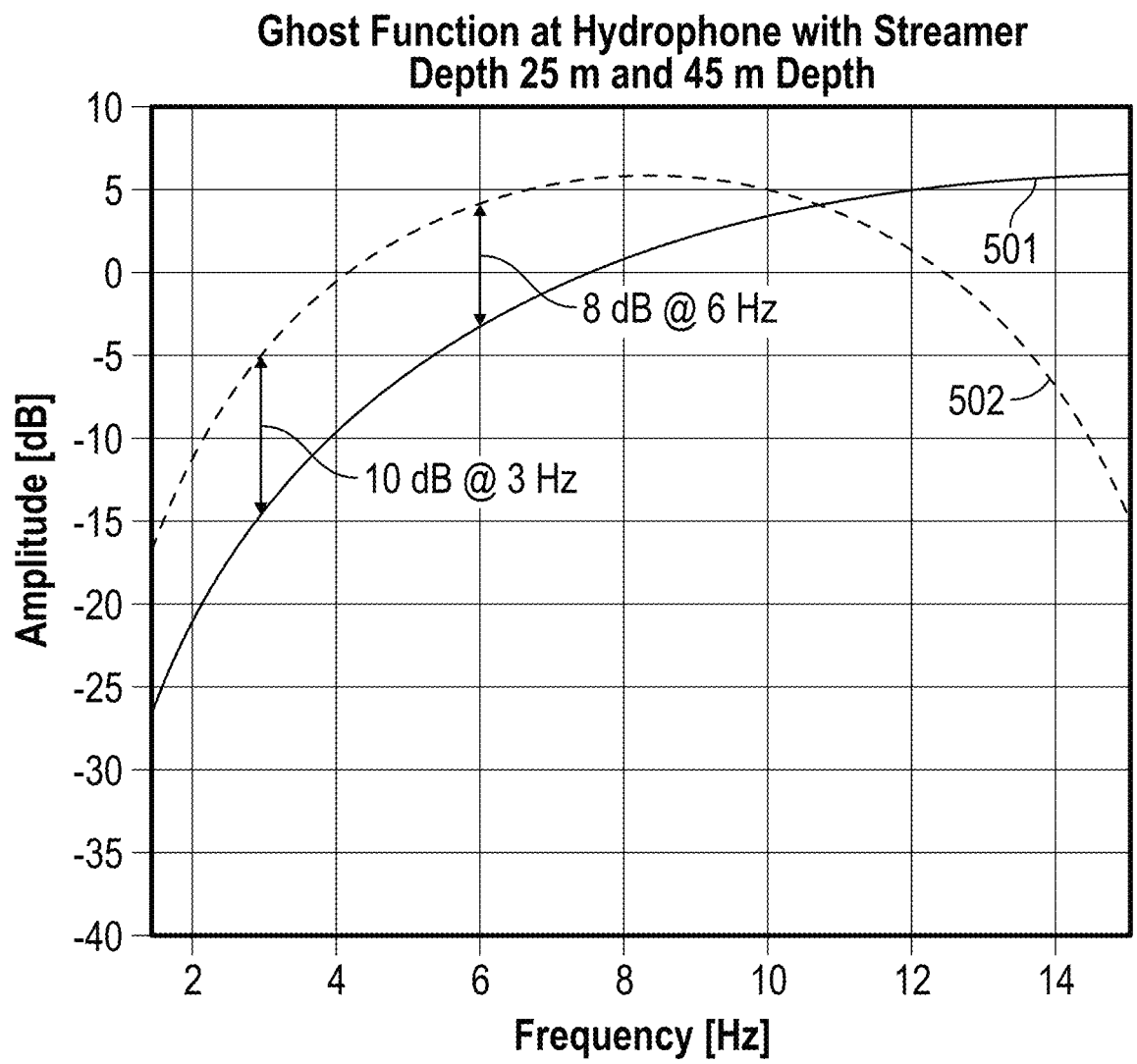
FIG. 5 illustrates a ghost function for seismic receivers towed at two different streamer depths.

FIG. 5 illustrates a ghost function for seismic receivers (e.g., hydrophone) towed at two different streamer depths: 25 m (line 501) and 45 m (line 502). As illustrated, the vertical axis represents amplitude in decibels, and the horizontal axis represents frequency in hertz. It can be seen that the signals differ by about 10 dB at 3 Hz, and by about 8 dB at 6 Hz. In order to manage the ghost function when towing a DAS streamer (having synthetic receivers at each acoustic measurement location), some embodiments may process the acoustic data by summing together four receiver groups (e.g., 50 m groups). Summing the four groups may advantageously provide minimal aliasing below 15 Hz. Moreover, the noise may be estimated as the square root of four (the number of groups summed). Therefore, in this instance, the noise floor may be lowered by about 6 dB. Likewise, in order to manage the ghost function when a DAS streamer (having synthetic receivers at each acoustic measurement location), some embodiments may tow the DAS streamer at 45 m, while towing the standard streamers at 25 m. By towing the DAS streamer at 45 m, the S/N may be advantageously improved by about 5 dB to about 10 dB in frequency ranges from about 3 Hz to about 8 Hz, at least in part due to the ghost function. In some embodiments, the S/N may be improved by about 11 dB to about 16 dB for frequency ranges from about 3 Hz to about 8 Hz, thereby rivaling S/N achievable by ocean bottom nodes.

Figure 6A:
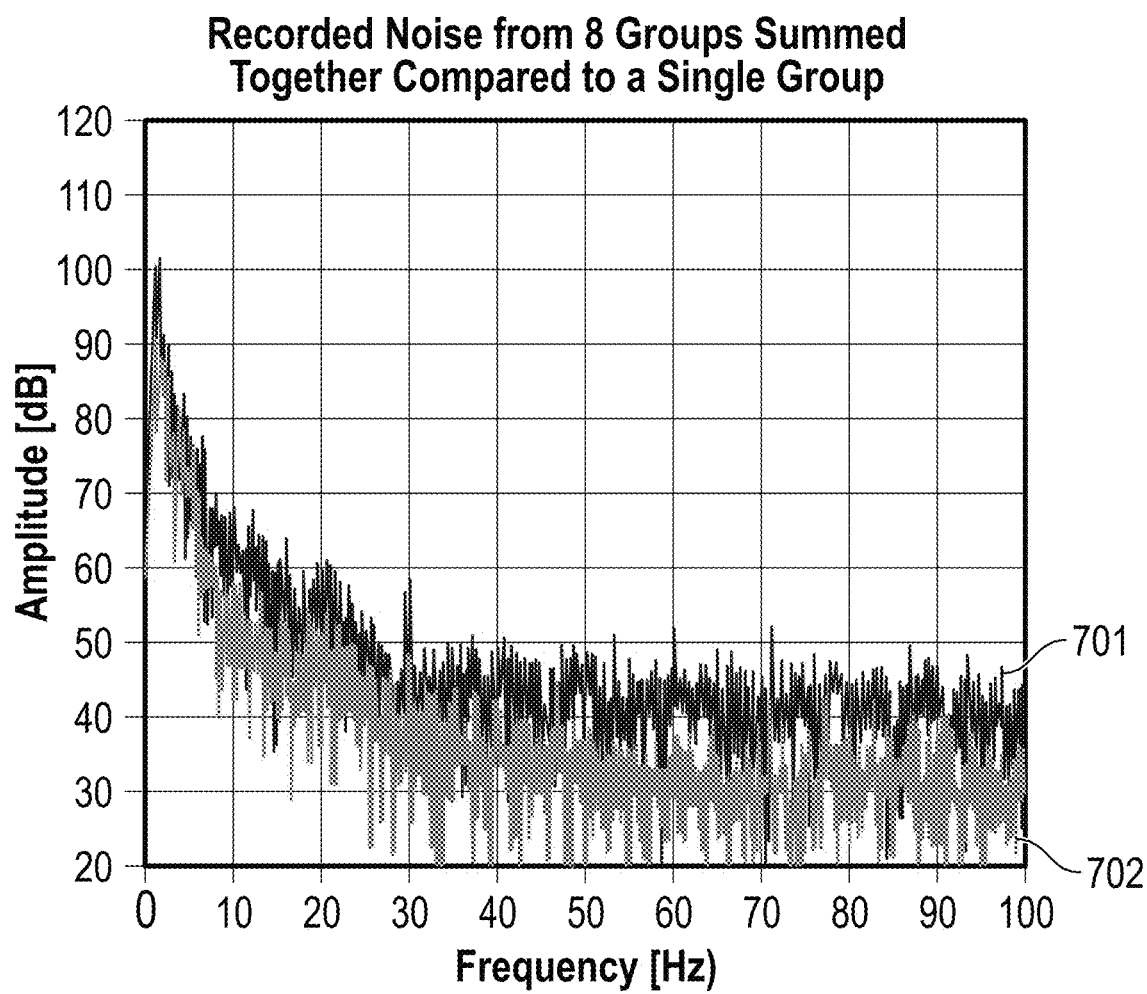
FIGS. 6A and 6B illustrate comparisons of noise for various receiver group lengths.
Figure 6B:
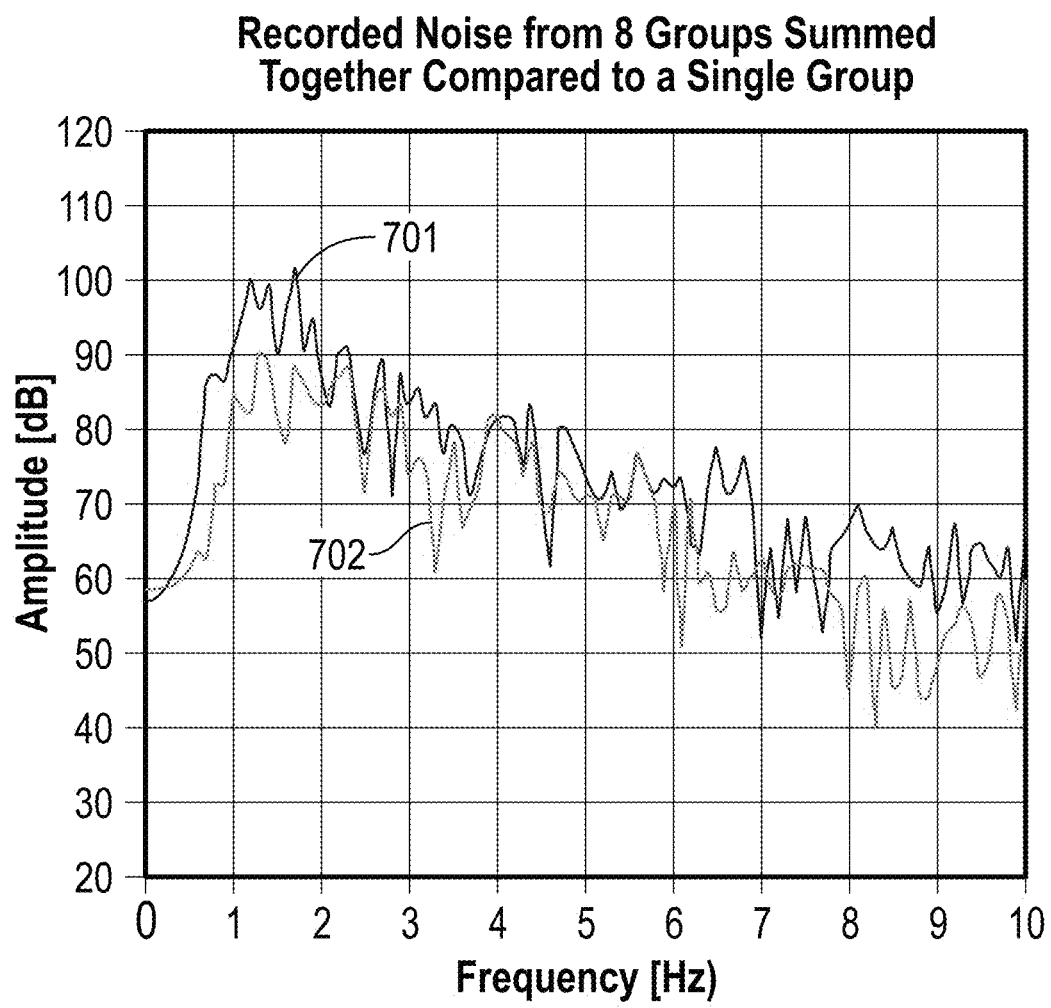

FIGS. 6A and 6B illustrate comparisons of noise (as a function of frequency) for receiver group lengths of about 12.5 m to receiver group lengths of about 100 m. FIG. 6B is a close-up of FIG. 6A in the range of 0-10 Hz. As illustrated, the vertical axis represents amplitude in decibels, and the horizontal axis represents frequency in hertz. Lines 701 illustrate the noise present after summing data over receiver group lengths of about 12.5 m. Lines 702 illustrate the noise present after summing data over receiver group lengths of about 100 m (e.g., by summing data from eight receiver groupings, each having a receiver group length of about 12.5 m). Note that the noise amplitude is significantly higher for the 12.5 m receiver group length, and the difference is on the order of 10 dB in much of the spectrum below 10 Hz.

Figure 7A:
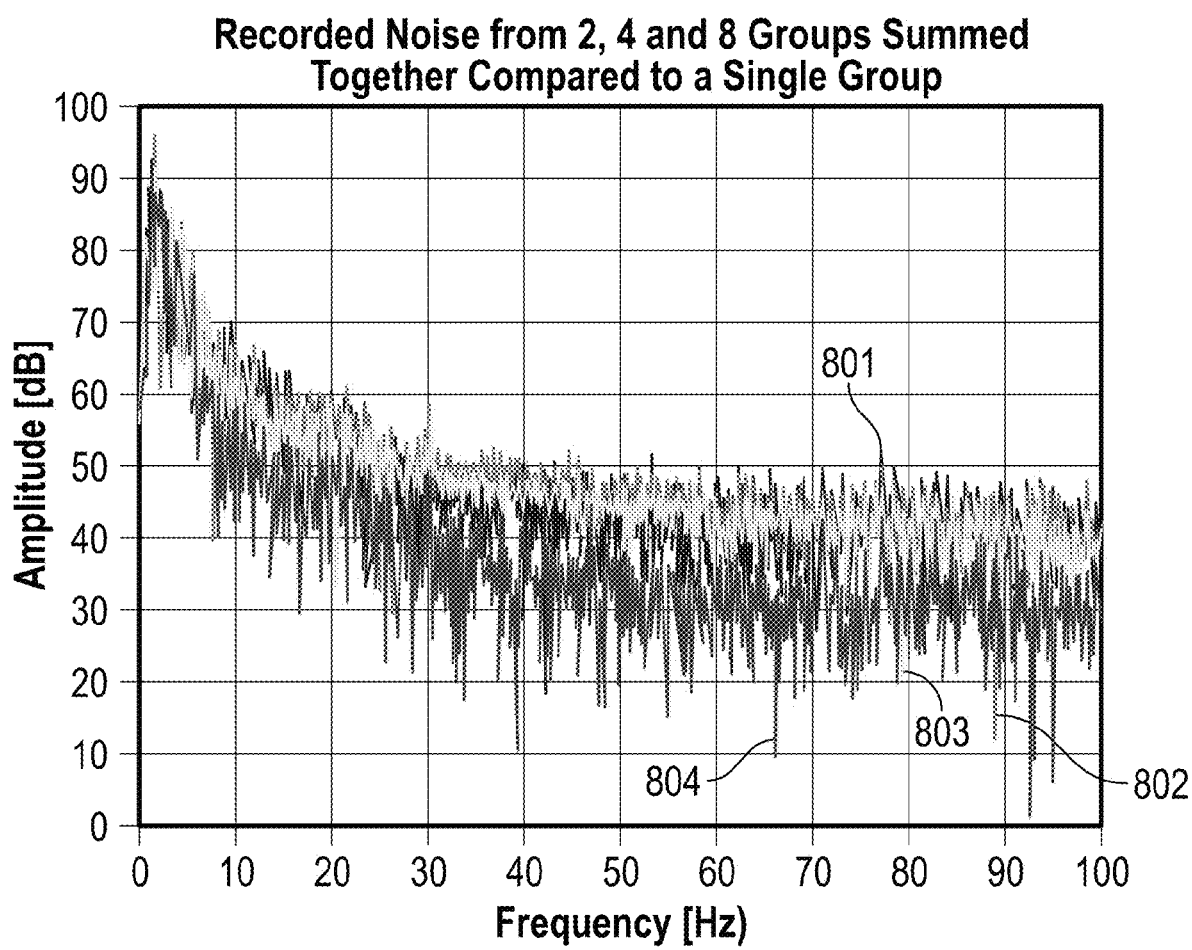
FIGS. 7A and 7B illustrate further comparisons of noise for various receiver group lengths.
Figure 7B:
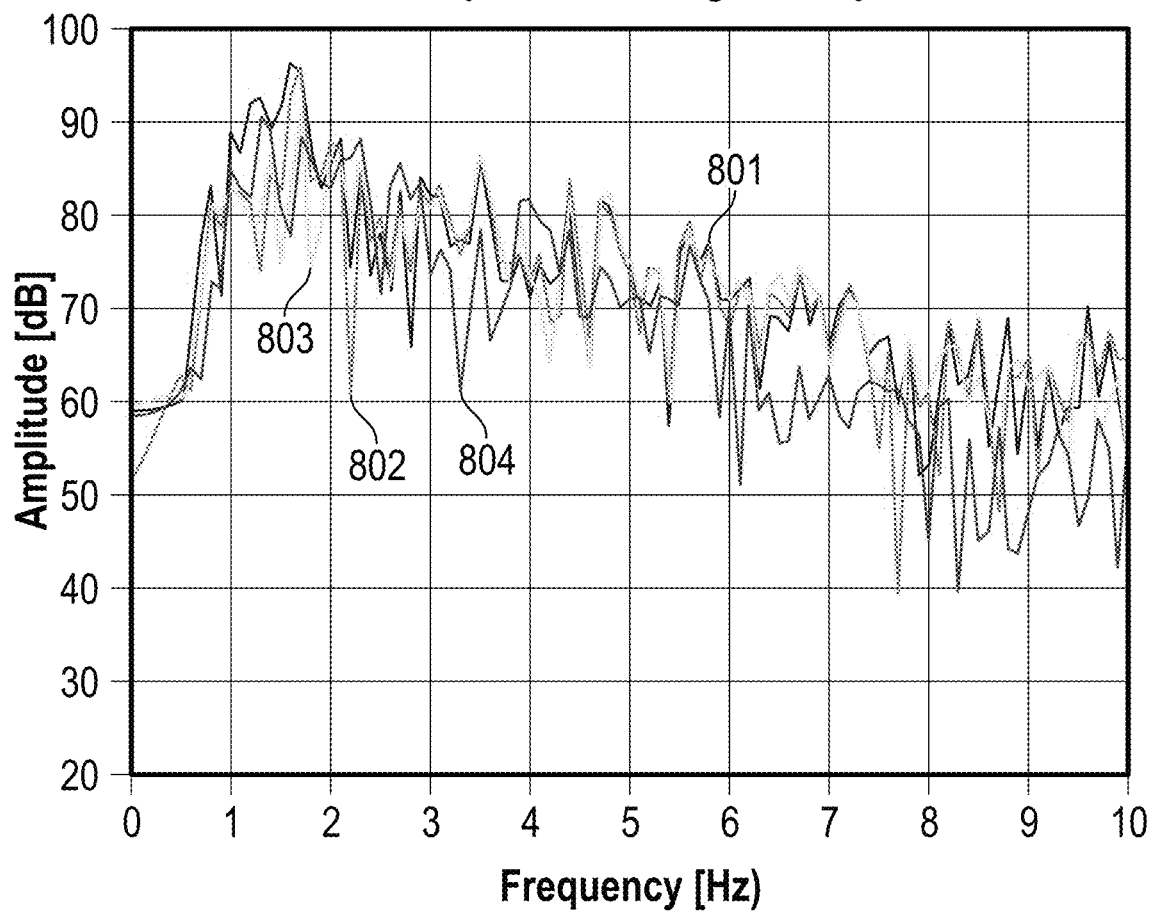

FIGS. 7A and 7B illustrate comparisons of noise (as a function of frequency) for receiver group lengths of about 12.5 m (lines 801) to receiver group lengths of about 25 m (lines 802), about 50 m (lines 803), and about 100 m (lines 804). FIG. 7B is a close-up of FIG. 7A in the range of 0-10 Hz. As illustrated, the vertical axis represents amplitude in decibels, and the horizontal axis represents frequency in hertz. Lines 801 illustrate the noise present after summing data over receiver group lengths of about 12.5 m. Lines 802 illustrate the noise present after summing data over receiver group lengths of about 25 m (e.g., by summing data from two receiver groupings, each having a receiver group length of about 12.5 m). By aggregating signals from two adjacent groups, larger recording groups of 25 m length each are generated. Lines 803 illustrate the noise present after summing data over receiver group lengths of about 50 m (e.g., by summing data from four receiver groupings, each having a receiver group length of about 12.5 m). By aggregating signals from four adjacent groups, larger recording groups of 50 m length each are generated. Lines 804 illustrate the noise present after summing data over receiver group lengths of about 100 m (e.g., by summing data from eight receiver groupings, each having a receiver group length of about 12.5 m). By aggregating signals from the eight adjacent groups, larger recording groups of 100 m length each are generated.

Figure 8A:
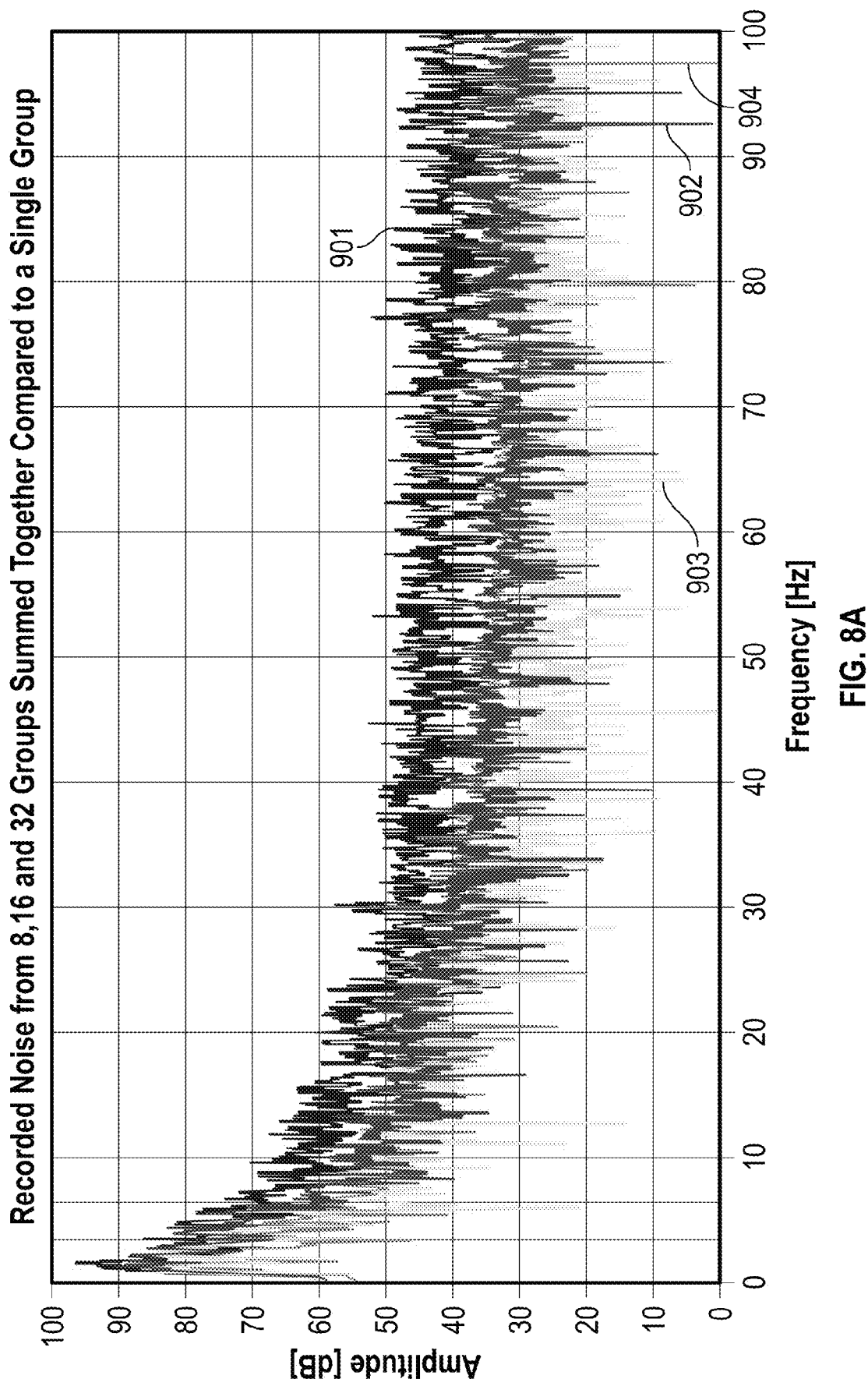
FIGS. 8A and 8B illustrate further comparisons of noise for various receiver group lengths.
Figure 8B:
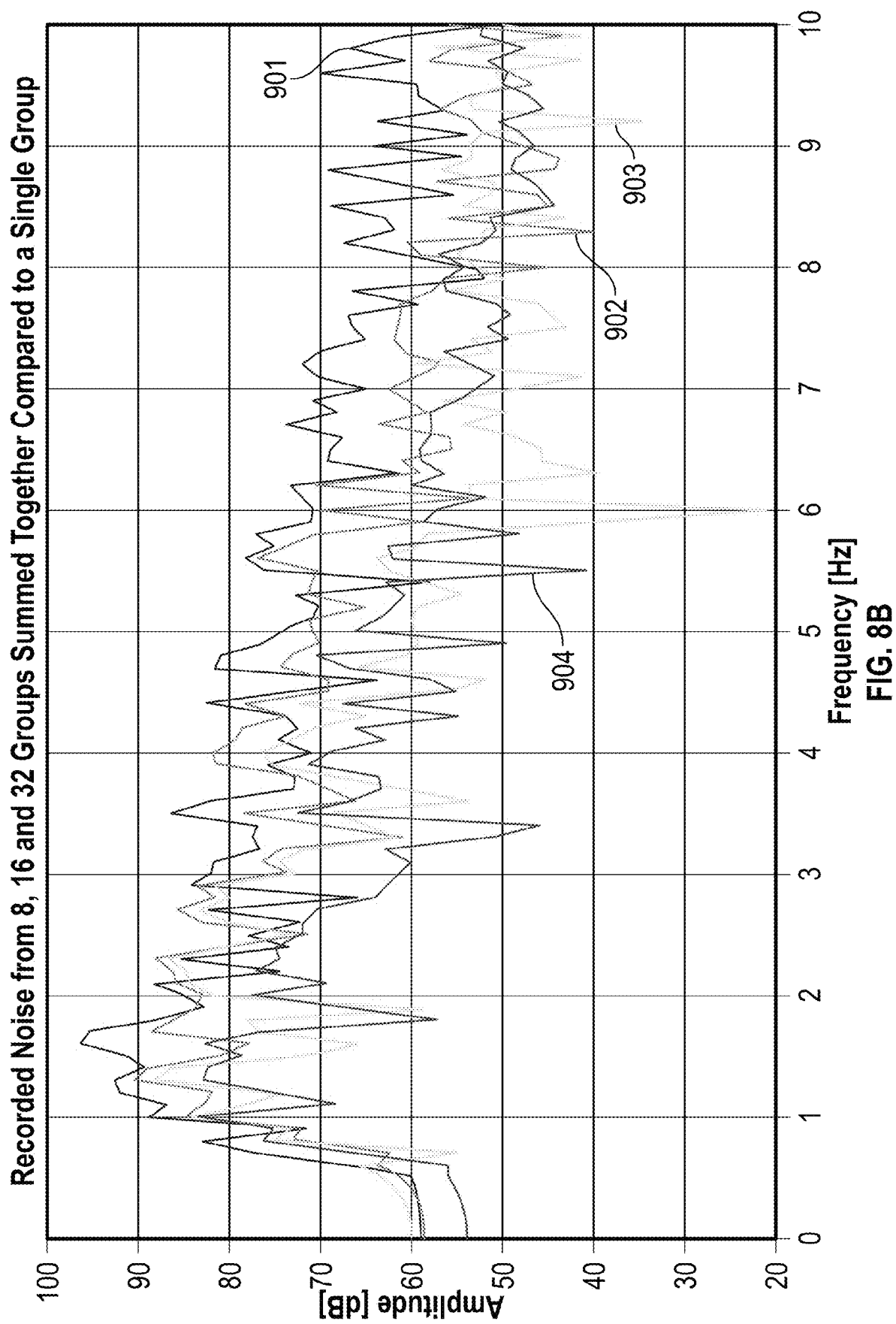

FIGS. 8A and 8B illustrate comparisons of noise (as a function of frequency) for receiver group lengths of about 12.5 m (lines 901) to receiver group lengths of about 100 m (lines 902), about 200 m (lines 903), and about 400 m (lines 904). FIG. 8B is a close-up of FIG. 8A in the range of 0-10 Hz. As illustrated, the vertical axis represents amplitude in decibels, and the horizontal axis represents frequency in hertz. Lines 901 illustrate the noise present after summing data over receiver group lengths of about 12.5 m. Lines 902 illustrate the noise present after summing data over receiver group lengths of about 100 m (e.g., by summing data from eight receiver groupings, each having a receiver group length of about 12.5 m). By aggregating signals from eight adjacent groups, larger recording groups of 25 m length each are generated. Lines 903 illustrate the noise present after summing data over receiver group lengths of about 200 m (e.g., by summing data from sixteen receiver groupings, each having a receiver group length of about 12.5 m). By aggregating signals from sixteen adjacent groups, larger recording groups of 200 m length each are generated. Lines 904 illustrate the noise present after summing data over receiver group lengths of about 400 m (e.g., by summing data from thirty-two receiver groupings, each having a receiver group length of about 12.5 m). By aggregating signals from thirty-two adjacent groups, larger recording groups of 400 m length each are generated.

Figure 9:
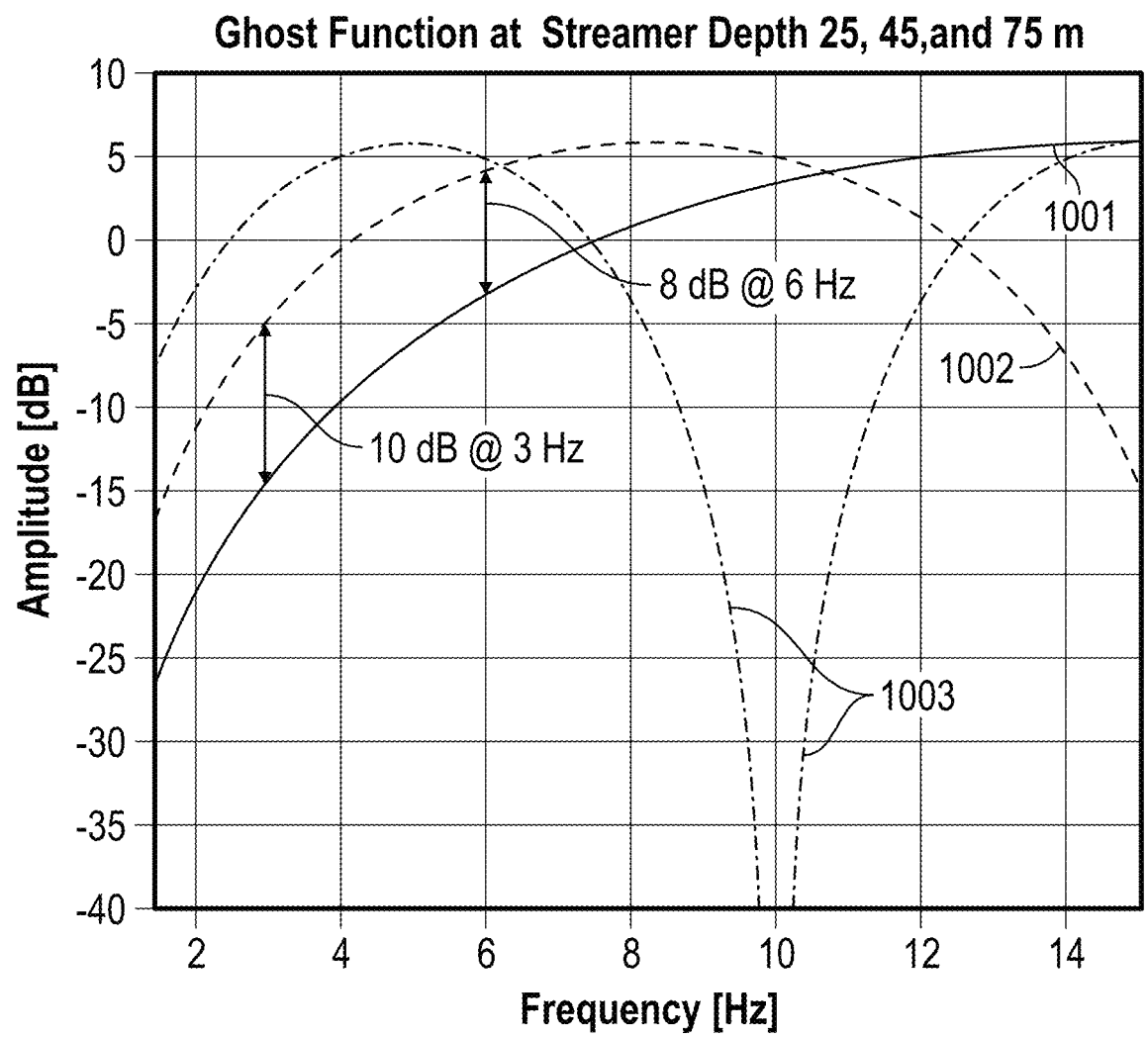
FIG. 9 illustrates a ghost function for seismic receivers towed at three different streamer depths.

FIG. 9 illustrates a ghost function for seismic receivers towed at three different streamer depths: 25 m (line 1001), 45 m (line 1002), and 75 m (lines 1003). As illustrated, the vertical axis represents amplitude in decibels, and the horizontal axis represents frequency in hertz. It can be seen that the signals differ by about 10 dB at 3 Hz, and by about 8 dB at 6 Hz. In order to manage the ghost function when towing receivers with a DAS streamer, some embodiments may process the receiver data by summing together eight receiver groups (e.g., 100 m groups). Summing the eight groups may advantageously provide minimal aliasing below 7.5 Hz. Moreover, the noise may be estimated as the square root of eight (the number of groups summed). Therefore, in this instance, the noise floor may be lowered by about 9 dB. Likewise, in order to manage the ghost function when towing receivers with a DAS streamer, some embodiments may tow the DAS streamer at 75 m, while towing the standard streamers at 25 m. By towing the DAS streamer at 75 m, the S/N may be advantageously improved by about 8 dB to about 17 dB in frequency ranges from about 2 Hz to about 6 Hz, at least in part due to the ghost function. In some embodiments, the S/N may be improved by about 17 dB to about 26 dB for frequency ranges from about 2 Hz to about 6 Hz, thereby rivaling S/N achievable by ocean bottom nodes.

Figure 10:
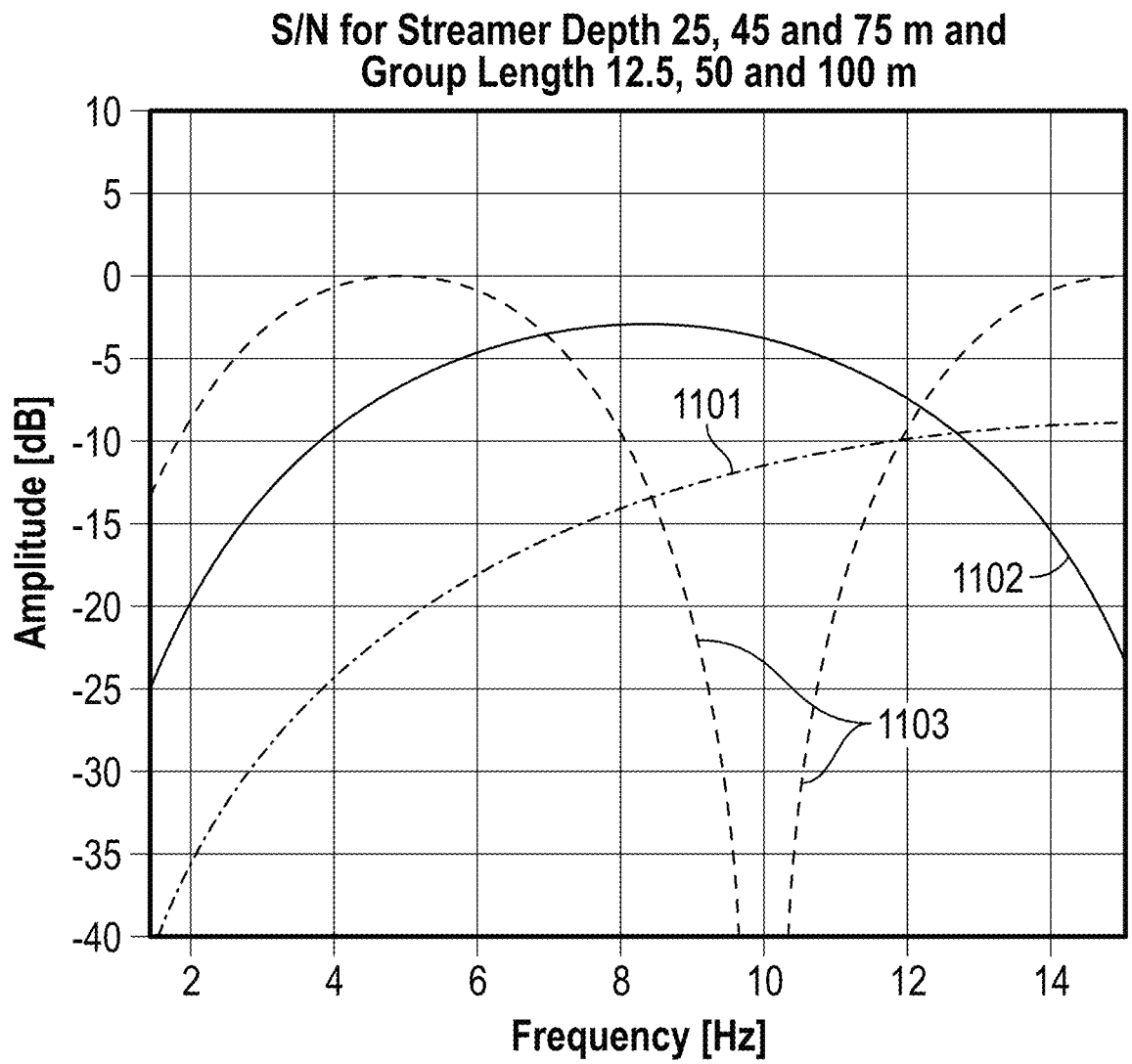
FIG. 10 illustrates relative differences in signal-to-noise ratio for three different scenarios for towing seismic receivers at long-offsets.

FIG. 10 illustrates relative differences in S/N for three different scenarios for towing seismic receivers with DAS streamers. One scenario shows the S/N for towing a group of receivers having a group length of about 12.5 m at a depth of about 25 m (line 1101). Another scenario shows the S/N for towing a group of receivers having a group length of about 50 m at a depth of about 45 m (line 1102). Yet another scenario shows the S/N for towing a group of receivers having a group length of about 75 m at a depth of about 100 m (lines 1103).

Figure 11:
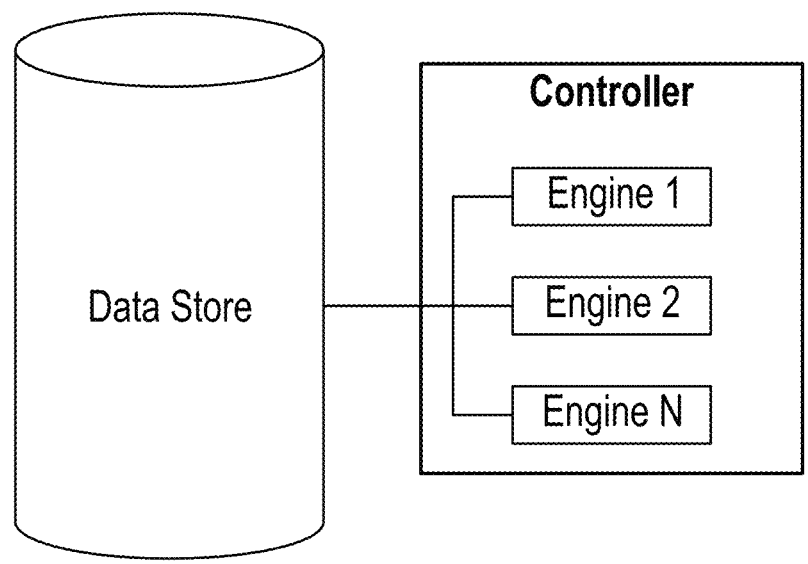
FIG. 11 illustrates a system for a long-offset surveying method.

FIG. 11 illustrates a system for a long-offset acquisition method. The system can include a data store and a controller coupled to the data store. The controller can be analogous to the controller described with respect to the recording system 112 of FIG. 1. The data store can store survey data.

The controller can include a number of engines (e.g., engine 1, engine 2, . . . engine N) and can be in communication with the data store via a communication link. The system can include additional or fewer engines than illustrated to perform the various functions described herein. As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, etc.

The number of engines can include a combination of hardware and program instructions that is configured to perform a number of functions described herein. The program instructions, such as software, firmware, etc., can be stored in a memory resource such as a machine-readable medium or as a hard-wired program such as logic. Hard-wired program instructions can be considered as both program instructions and hardware.

The controller can be configured, for example, via a combination of hardware and program instructions in the number of engines for a long-offset acquisition method. For example, a first engine (e.g., engine 1) can be configured to actuate sources, process data, and/or acquire data gathered during acquisition using a long-offset acquisition configuration (e.g., utilizing DAS streamers) and method.

Figure 12:
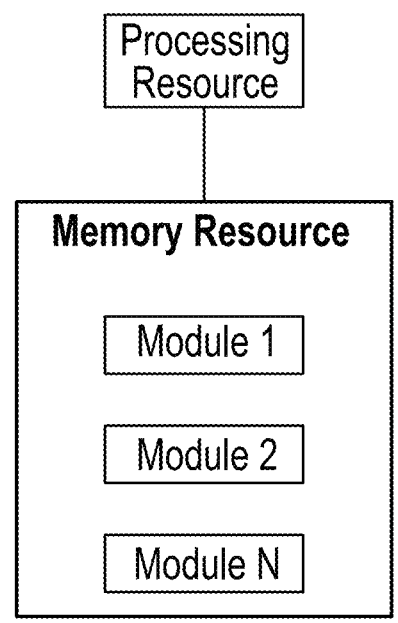
FIG. 12 illustrates a machine for a long-offset acquisition method.

FIG. 12 illustrates a machine for a long-offset acquisition method. In at least one embodiment, the machine can be analogous to the system illustrated in FIG. 11. The machine can utilize software, hardware, firmware, and/or logic to perform a number of functions. The machine can be a combination of hardware and program instructions configured to perform a number of functions (e.g., actions). The hardware, for example, can include a number of processing resources and a number of memory resources, such as a machine-readable medium or other non-transitory memory resources. The memory resources can be internal and/or external to the machine, for example, the machine can include internal memory resources and have access to external memory resources. The program instructions, such as machine-readable instructions, can include instructions stored on the machine-readable medium to implement a particular function. The set of machine-readable instructions can be executable by one or more of the processing resources. The memory resources can be coupled to the machine in a wired and/or wireless manner. For example, the memory resources can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources can be tangible and/or non-transitory, and can include volatile and/or non-volatile memory. Volatile memory can include memory that depends upon power to store information, such as various types of dynamic random-access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources can be coupled to the memory resources via a communication path. The communication path can be local to or remote from the machine. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

Although not specifically illustrated in FIG. 12, the memory resources can store survey data. As is shown in FIG. 12, the machine-readable instructions stored in the memory resources can be segmented into a number of modules (e.g., module 1, module 2, . . . module N) that when executed by the processing resources can perform a number of functions. As used herein a module includes a set of instructions included to perform a particular task or action. The number of modules can be sub-modules of other modules. For example, module 1 can be a sub-module of module 2. Furthermore, the number of modules can comprise individual modules separate and distinct from one another. Examples are not limited to the specific modules illustrated in FIG. 12.

In at least one embodiment of the present disclosure, a first module (e.g., module 1) can include program instructions and/or a combination of hardware and program instructions that, when executed by a processing resource, can actuate sources, process data, and/or acquire data gathered during acquisition using a long-offset acquisition configuration (e.g., utilizing DAS streamers) and method.

The methods and systems described herein may be used to manufacture a geophysical data product indicative of certain properties of a subterranean formation. The geophysical data product may include geophysical data such as survey data, seismic data, electromagnetic data, pressure data, particle motion data, particle velocity data, particle acceleration data, and any seismic image that results from using the methods and systems described above. The geophysical data product may be stored on a tangible and/or non-transitory computer-readable medium as described above. The geophysical data product may be produced offshore (i.e., by equipment on the survey vessel) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

In accordance with a number of embodiments of the present disclosure, a geophysical data product may be produced. The geophysical data product may include, for example, low-frequency and/or long-offset survey data. Geophysical data, such as data previously collected by seismic sensors, electromagnetic sensors, depth sensors, location sensors, etc., may be obtained (e.g., retrieved from a data library) and may be recorded on a non-transitory, tangible computer-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis, including further data processing, may be performed on the geophysical data product. In some instances, geophysical analysis may be performed on the geophysical data product offshore, for example, FWI.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

While the foregoing is directed to embodiments of the present disclosure, other and further embodiments of the disclosure may be devised without departing from the basic scope thereof, and the scope thereof is determined by the claims that follow.

The invention claimed is:

1. A method of marine surveying, comprising:
towing a streamer spread at a first depth of 10 m to 30 m with a survey vessel, wherein the streamer spread comprises plural streamers, and wherein each of the plural streamers has a length of not more than 10 km and comprises at least hydrophone sensors; and
towing one or more Distributed Acoustic Sensing (DAS) streamers at a second depth of greater than 30 m;
wherein each of the DAS streamers has a length of at least 20 km and comprises an optical fiber sensing element disposed therein and configured to provide a synthetic receiver density of at least 1 sample per 30 meters along the length of the DAS streamer; and
wherein each of the DAS streamers has an outside diameter between 15 mm and 25 mm.

2. The method of claim 1, wherein the one or more DAS streamers consists of two DAS streamers.

3. The method of claim 2, wherein the streamer spread is a narrow-azimuth spread.

4. The method of claim 1, wherein the DAS streamers are towed by a long-offset streamer vessel that is distinct from the survey vessel.

5. The method of claim 4, wherein the long-offset streamer vessel follows an individual path different than that of the survey vessel.

6. The method of claim 1, further comprising acquiring geophysical data at measurement locations distributed along the DAS streamers.

7. The method of claim 6, further comprising processing the geophysical data by grouping the measurement locations into a plurality of groups, each group having a group length along the respective DAS streamer of 20 m to 40 m.

8. The method of claim 6, wherein the geophysical data comprises low-frequency data corresponding to seismic signals below about 30 Hz.

9. The method of claim 6, further comprising storing the geophysical data on a non-transitory machine-readable medium, thereby completing the manufacture of a geophysical data product.

10. The method of claim 9, wherein the storing the geophysical data is done by a recording system on the survey vessel.

* * * * *